United States Patent
Hiasa

(10) Patent No.: US 10,154,216 B2
(45) Date of Patent: Dec. 11, 2018

(54) IMAGE CAPTURING APPARATUS, IMAGE CAPTURING METHOD, AND STORAGE MEDIUM USING COMPRESSIVE SENSING

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 15/594,943

(22) Filed: May 15, 2017

(65) Prior Publication Data
US 2017/0339363 A1   Nov. 23, 2017

(30) Foreign Application Priority Data
May 17, 2016  (JP) ................................ 2016-098709

(51) Int. Cl.
| | |
|---|---|
| H04N 5/374 | (2011.01) |
| H04N 5/3745 | (2011.01) |
| H04N 5/235 | (2006.01) |
| H04N 5/225 | (2006.01) |
| H04N 5/238 | (2006.01) |
| H04N 5/378 | (2011.01) |
| H04N 5/232 | (2006.01) |

(52) U.S. Cl.
CPC ....... *H04N 5/37452* (2013.01); *H04N 5/2254* (2013.01); *H04N 5/235* (2013.01); *H04N 5/238* (2013.01); *H04N 5/2356* (2013.01); *H04N 5/378* (2013.01); *H04N 5/23232* (2013.01)

(58) Field of Classification Search
CPC .................................................. H04N 5/37452
USPC ....................................................... 348/221.1
See application file for complete search history.

(56) References Cited

U.S. PATENT DOCUMENTS

| | | | |
|---|---|---|---|
| 2014/0029850 A1* | 1/2014 | Meyers | ..................... G06T 5/50 382/167 |
| 2014/0313288 A1 | 10/2014 | Dai et al. | |

OTHER PUBLICATIONS

Baraniuk, "Compressive Sensing," IEEE Signal Processing Magazine, pp. 118-120, 124, Jul. 2007.

(Continued)

*Primary Examiner* — Joel W Fosselman
(74) *Attorney, Agent, or Firm* — Rossi, Kimms & McDowell LLP

(57) ABSTRACT

An image capturing apparatus acquires a light intensity distribution in an object space through image capturing using a plurality of pixels, sets a coefficient distribution that is a distribution of a coefficient corresponding to each of the plurality of pixels and is to be applied to the light intensity distribution, acquires object space information that is information on the object space and different from the light intensity distribution, sets first pixel group and second pixel groups that are different from each other in the plurality of pixels based on the object space information, and generates a combined image by combining a plurality of light intensity distributions obtained by applying the coefficient distributions to each of the plurality of pixels obtained with a plurality of image capturing conditions.

15 Claims, 12 Drawing Sheets

(56) References Cited

OTHER PUBLICATIONS

Bioucas-Dias et al., "A New TwIST: Two-Step Iterative Shrinkage/Thresholding Algorithms for Image Restoration," IEEE Transactions on Image Processing, vol. 16, pp. 1-13, Dec. 2007.

Eigen et al., "Depth Map Prediction from a Single Image using a Multi-Scale Deep Network," (http://arxiv.org/pdf/1406.2283.pdf), pp. 1-9.

* cited by examiner

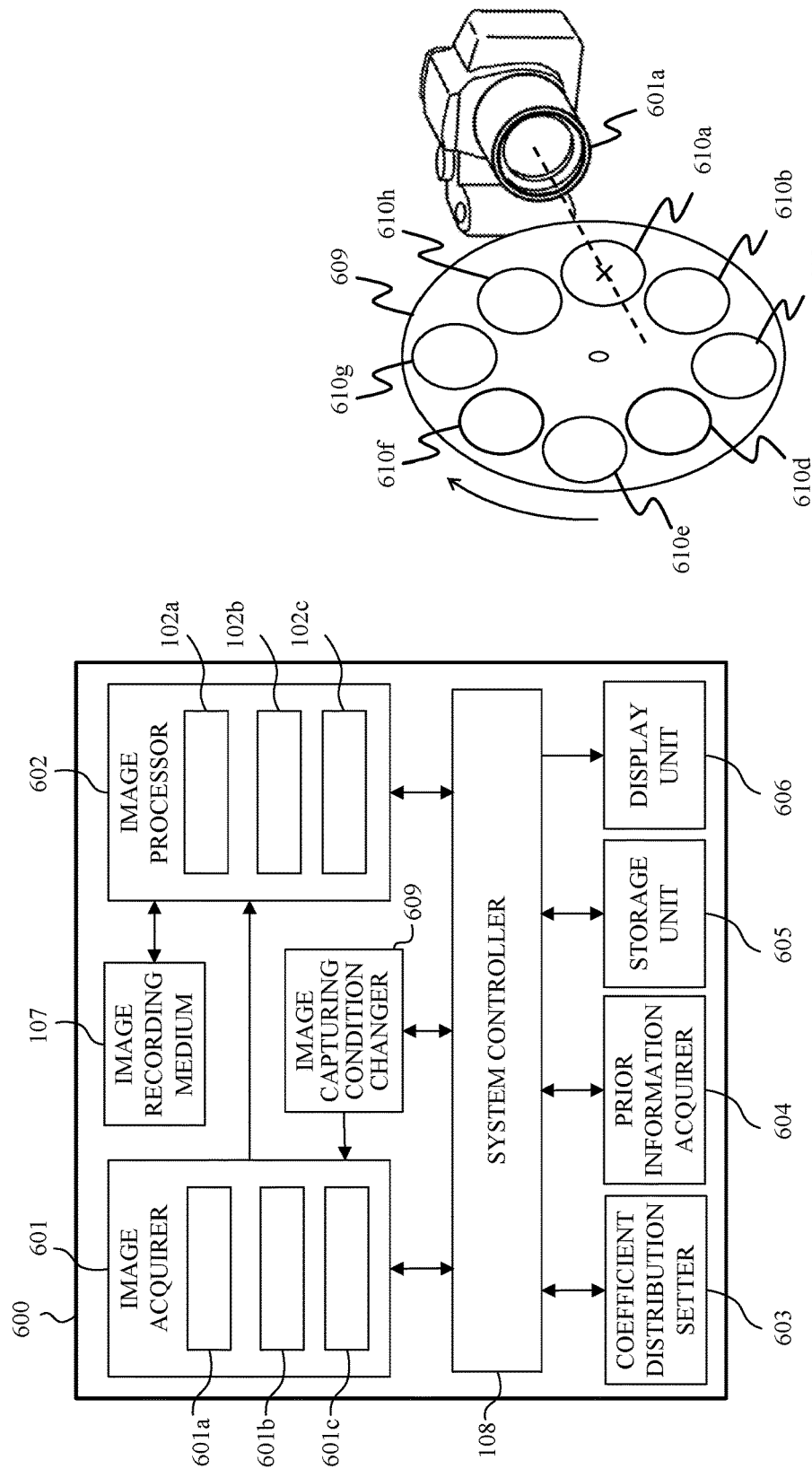

IMAGE CAPTURING APPARATUS, IMAGE CAPTURING METHOD, AND STORAGE MEDIUM USING COMPRESSIVE SENSING

BACKGROUND OF THE INVENTION

Field of the Invention

The present invention relates to a technology of acquiring image data generated by image capturing utilizing compressive sensing.

Description of the Related Art

A technology referred to as compressive sensing has been proposed for image capturing for acquiring information of an object space. This technology utilizes a sparse characteristic of an object image to be captured and attempts to restore a high-resolution object image based on a small amount of observation data. The sparse characteristic means a sparse expression, in which when the object image is base-transformed, many of the coefficients become zero.

U.S. Patent Application No. 2014/0313288 discloses a method for obtaining a plurality of images focused on different depths in an object space using the compressive sensing. This method provides a transmittance distribution (or a modulation function in this reference) that is different for each depth in image capturing, and obtains image data made by adding the transmittance distributions to one another. This method estimates an image focused on each depth by considering the sparse characteristic based on information on the image data and the given transmittance distribution. Thereby, this method can obtain a plurality of images (in-focus images on each depth) based on one image datum.

It is difficult for the method disclosed in U.S. Patent Application No. 2014/0313288 to estimate an in-focus image for each depth with a high resolution: In order to estimate an in-focus image for each depth, it is necessary to separate information on different in-focus positions made by the weighted addition (weighted by the transmittance) in one pixel and to solve an underdetermined problem in which the number of estimated objects is more than the number of observations. Thus, the estimated image is generally an approximated solution different from an exact solution and the resolution lowers due to the approximation.

SUMMARY OF THE INVENTION

The present invention provides an image capturing apparatus, an image capturing method, etc. which can obtain information on an object space with a high resolution and the small observation number.

An image capturing apparatus according to one aspect of the present invention includes a light intensity distribution acquirer configured to acquire a light intensity distribution in an object space through image capturing using a plurality of pixels, a coefficient distribution setter configured to set a coefficient distribution that is a distribution of a coefficient corresponding to each of the plurality of pixels and is to be applied to the light intensity distribution, such that the coefficient distribution is different for each image capturing condition, an information acquirer configured to acquire object space information that is information on the object space and different from the light intensity distribution, a pixel group setter configured to set a first pixel group and a second pixel group that are different from each other in the plurality of pixels, based on the object space information, and an image generator configured to generate a combined image by combining a plurality of light intensity distributions obtained by applying the coefficient distribution to each of a plurality of light intensity distributions obtained on a plurality of image capturing conditions. The coefficient distribution setter sets a first coefficient distribution as at least one of the plurality of coefficient distributions applied to each of the plurality of light intensity distributions, such that fundamental statistics of the coefficient distribution for the first pixel group is different from that for the second pixel group in the first coefficient distribution.

Further features of the present invention will become apparent from the following description of exemplary embodiments with reference to the attached drawings.

BRIEF DESCRIPTION OF THE DRAWINGS

FIG. 19A is a block diagram of a configuration of an image capturing apparatus according to the fourth embodiment.

FIG. 19B is an overview of the image capturing apparatus according to the fourth embodiment.

DESCRIPTION OF THE EMBODIMENTS

Figure 2:
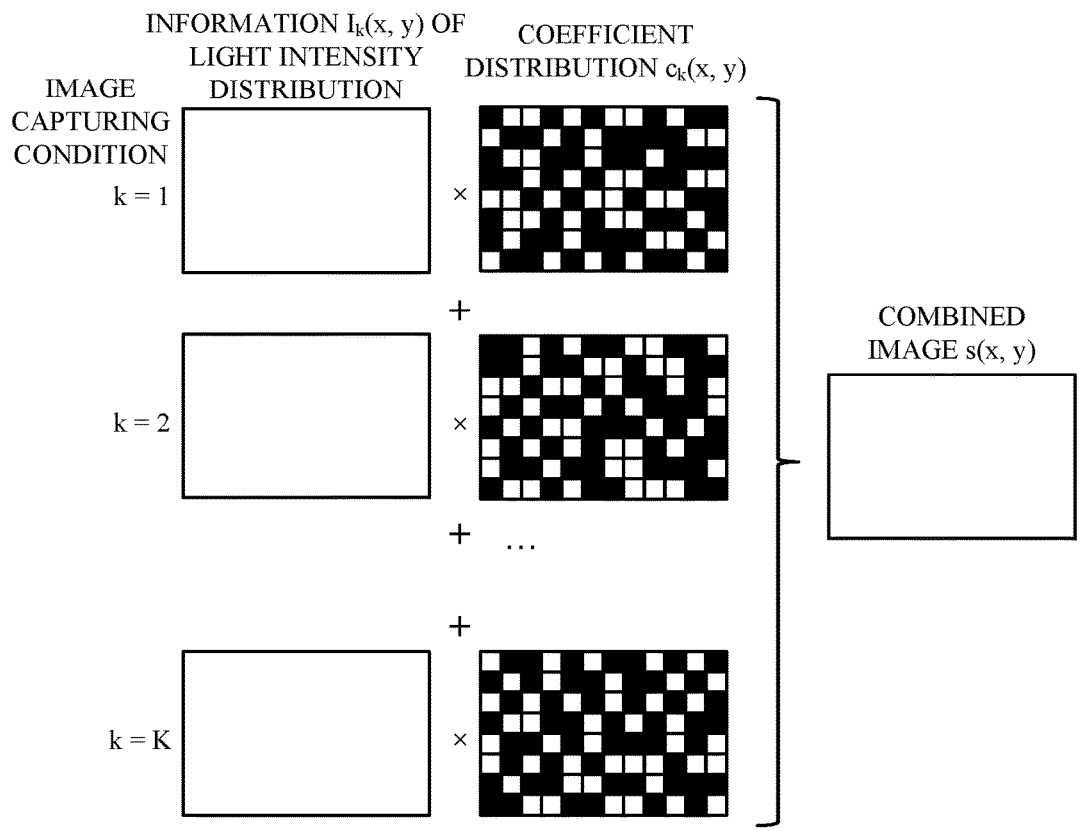
FIG. 2 is a view for explaining a combined image according to the first to fourth embodiments.

Referring now to the accompanying drawings, a description will be given of embodiments of the present invention. Prior to the description of the concrete embodiments (such as first to fourth embodiments), a description will be given of a matter common to each embodiment. Each embodiment generates, as illustrated in FIG. 2, a combined image by combining (adding) a plurality of light intensity distributions obtained by applying different coefficient distributions to a plurality of image capturing conditions of the object space that are different from each other, using the compressive sensing. Each embodiment generates image data that contains information corresponding to each of the plurality of image capturing conditions by the post-capture image processing to the combined image. In this case, each embodiment utilizes a fact that the target area in which the information on the object space is to be obtained with a high resolution depends on the image capturing condition, and differentiates the fundamental statistics of the coefficient distribution (which will be described later) that is conventionally uniform. Thereby, each embodiment improves the resolution of the obtained information.

The coefficient distribution is applied to the light intensity distribution in generating the combined image, for example, by multiplying the light intensity distributions by a coefficient distribution and by summing them up. FIG. 2 illustrates the coefficient distribution through a binary expression with black and white, but an available value to the coefficient is not limited to this figure.

The image capturing condition is determined by a parameter (referred to as an "image capturing parameter" hereinafter), such as a space (or angle of view) to be captured and image capturing time (release timing or frame in a motion image), an exposure value, an exposure time period, an F-number, an in-focus position, a viewpoint (or observing position), a wavelength for a light intensity distribution to be obtained, and a polarization state.

In obtaining a plurality of image data on different image capturing conditions, an area is often different in which the information on the object space is to be obtained with a high resolution for each image capturing condition. For example, assume that a plurality of image data with different in-focus positions are obtained as disclosed in U.S. Patent No. 2014/0313288. Since the plurality of image data obtained on different image capturing conditions are focused on different depths (distances) in the object spaces, the image data have different areas in which high-frequency components exist. This is because there is no high-frequency components in the out-focus area due to the frequency degradation caused by defocus. Thus, high-resolution information on the image data obtained on each image capturing condition may be limited to information on an in-focus area. Utilizing this fact, the coefficient distribution is set such that low-resolution information is obtained on the image capturing condition in the defocus area and high-resolution information is obtained on the image capturing condition in the in-focus area.

For this purpose, assume an area used to obtain the high-resolution information (one of the first pixel group (or first pixels) and the second pixel group (or second pixels)) and the other area (the other of the first pixel group and the second pixel group) on one certain image capturing condition. In these two areas, coefficient distributions applied in the image capturing condition may have different fundamental statistic such as an average and a dispersion. The different fundamental statistics can increase an amount of high-resolution information for the area on the certain image capturing condition, in comparison with that on another image capturing condition, facilitate a separation of the high-resolution information on the certain image capturing condition in the image processing after the image is captured, etc. This effect can improve the resolution.

Thus, this principle provides high-resolution information of the object space with the small observation number.

The light intensity distribution contains a light intensity distribution of a pre-captured optical image (referred to as an "object space optical image" hereinafter), and a light intensity distribution of a signal (referred to as an "object space signal" hereinafter) obtained by capturing the optical image. Hence, the coefficient distribution may be applied to the object space optical image or the object space signal. The number of image capturing conditions used to acquire the light intensity distribution may not equal to the number of image capturing conditions used to generate the image data after the image is captured. For example, image data corresponding to two image capturing conditions may be generated through an estimation based on image data in which four light intensity distributions on the four image capturing conditions are summed up.

First Embodiment

A description will be given of an image capturing apparatus according to a first embodiment of the present invention. The first embodiment uses an in-focus position and an F-number for a variable image capturing parameter. Another image capturing parameter will be described in another embodiment, but all embodiments can be combined and all image capturing parameters can be used.

Figure 3B:
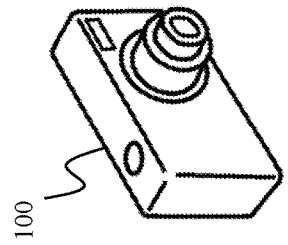
FIG. 3B is an overview of the image capturing apparatus according to the first and third embodiments.
Figure 3A:
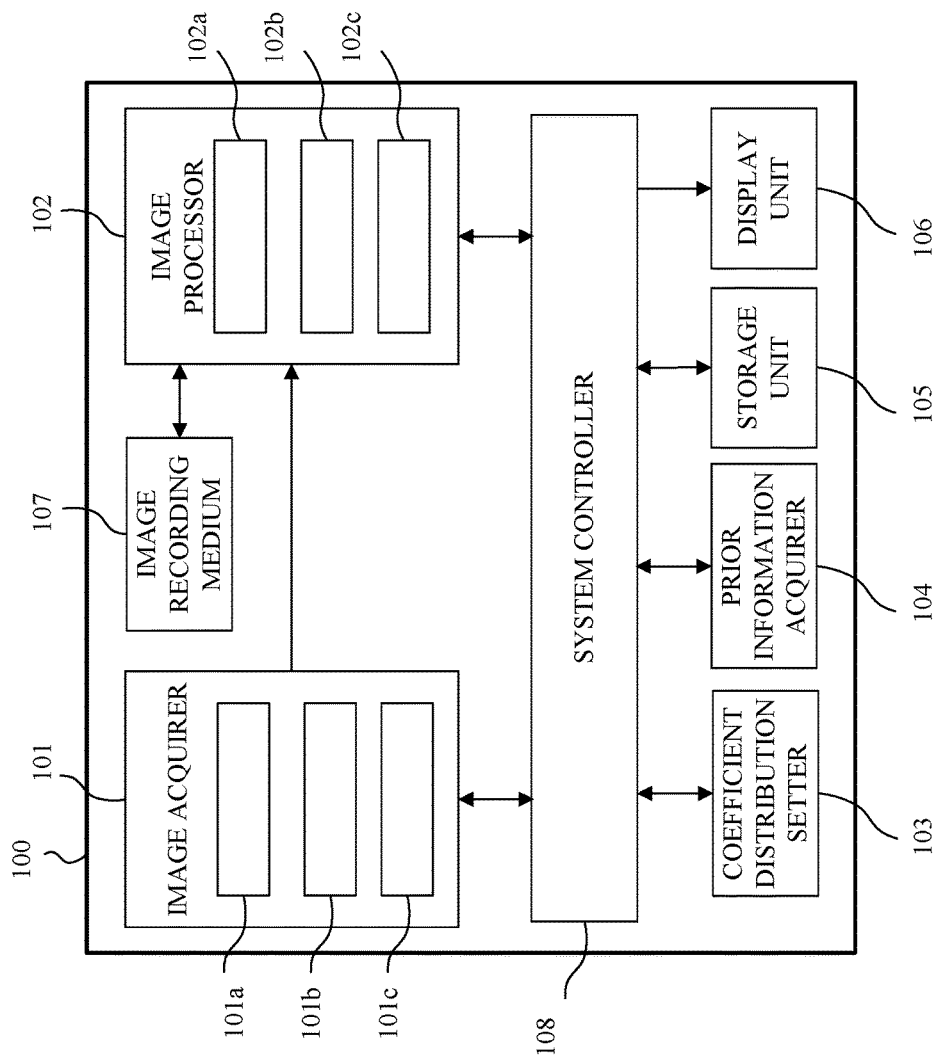
FIG. 3A is a block diagram of a configuration of an image capturing apparatus according to the first and third embodiments.

FIG. 3A illustrates a basic configuration of an image capturing apparatus 100 according to this embodiment, and FIG. 3B illustrates its overview. The image capturing apparatus 100 includes an image capturing unit (light intensity distribution acquirer) 101 configured to acquire light intensity distribution data as (captured) image data through image capturing based on information of the light intensity distribution in the object space. The image acquirer 101 includes an imaging optical system 101a configured to form an object space optical image (light intensity distribution), a coefficient distribution applier 101b configured to apply a coefficient distribution to the object space optical image, and an image sensor 101c configured to obtain (capture) an object space optical image to which the coefficient distribution is applied, through a plurality of pixels. The imaging optical system 101a changes at least one of the in-focus position and F-number when the image is captured, and forms the object space optical image on a plurality of image capturing conditions. The image sensor (image generator) 101c captures a plurality of object space optical images to which the coefficient distributions are applied on the plurality of image capturing conditions, generates a combined image in which the plurality of light intensity distributions are combined (summed up), and outputs the combined image to the image processor 102.

A coefficient distribution setter 103 sets the coefficient distribution that is different on each of the plurality of image capturing conditions when the image is captured. The coefficient distribution is a distribution of a coefficient assigned (corresponding) to each of the plurality of pixels on the image sensor 101c. The coefficient distribution setter 103 sets a coefficient distribution based on information (object space information or "prior information" hereinafter) on the object space obtained by a prior information acquirer (information acquirer) 104 and stores it in the storage unit 105. In this embodiment, the prior information is information representing a distribution of the depth (distance) in the object space.

An image processor 102 reads the information on the coefficient distribution applied to the object space optical image when the image is captured, from the storage unit 105, and generates a plurality of image data each corresponding to one of the plurality of image capturing conditions based on the above combined image. The image processor 102 includes an image acquirer 102a, an image estimator 102b, and an image generator 102c, and processing in each element will be described later. The image estimator 102b and the image generator 102c correspond to the image processing apparatus installed in the image capturing apparatus 100.

The coefficient distribution setter 103, the prior information acquirer 104, and the image processor 102 are configured as separate computer(s) from or as an integrated computer with the system controller 108, and operate in accordance with an image capturing program as a computer program.

The image data generated by the image processor 102 is displayed on the display unit 106 or stored in the image recording medium 107. When the combined image is stored in the image recording medium 107 and image data on each image capturing condition is displayed on the display unit 106, the image processor 102 may generate image data on each image capturing condition. The thus described operation of each component is controlled by a system controller 108 as a main computer.

Figure 4:
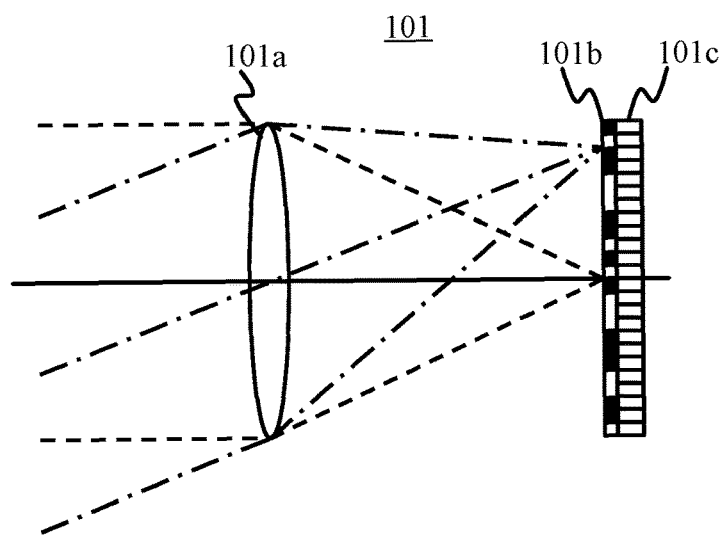
FIG. 4 illustrates a configuration of an image acquirer according to the first and fourth embodiments.

FIG. 4 illustrates a configuration of the image acquirer 101. In FIG. 4, a broken line and an alternate short and long dash line represent rays incident from the object space. The image sensor 101c includes, for example, a CCD (charge coupled device) sensor or a CMOS (complementary metal-oxide semiconductor) sensor. The coefficient distribution applier 101b is disposed just before the image sensor 101c, and applies the coefficient distribution to the object space optical image formed by the imaging optical system 101a. The coefficient distribution applier 101b includes, for example, a SLM (spatial light modulator), and each coefficient of the coefficient distribution has a value from 0 to 1. The coefficient distribution applier 101b may use a DMD (digital mirror device).

This embodiment sequentially sets a plurality of image capturing conditions in a time division manner by changing at least one of the position of the focus unit (in-focus position) and the F-number in the imaging optical system 101a, in an exposure time period in a single image capture. The coefficient distribution applier 101b applies a different coefficient distribution to the object space optical image for each image capturing condition. This configuration provides, as illustrated in FIG. 2, a combined image through the image sensor 101c in which a plurality of light intensity distributions are combined with one another or added to one another, which correspond to the plurality of the object space optical images captured with different coefficient distributions in the plurality of image capturing conditions.

A description will now be given of image capturing using compressive sensing and an image restoration. For simplicity, the description will use a monochromatic image but is applicable to a color image.

A combined image s(x, y) obtained by the image sensor 101c is expressed by the following expression (1).

$$s(x, y) = \sum_{k=1}^{K} c_k(x, y) I_k(x, y) + \eta(x, y) \quad (1)$$

Herein, x and y are coordinates in the longitudinal and lateral directions, and η(x, y) is a noise. K is the total number of image capturing conditions when the light intensity distributions to be combined (added) are obtained. $I_k$(x, y) is a light intensity distribution (object space optical image or object space signal) in an object space in a k-th image capturing condition. $c_k$(x, y) is a coefficient distribution applied to $I_k$(x, y).

The expression (1) can be rewritten by the matrix expression by the following expression (2).

$$s = H\iota + \eta \quad (2)$$

Herein, s, ι, and η are a vectorized combined image, light intensity distribution data obtained in each image capturing condition, and a noise. H is a matrix that expresses a combination (summation) of the coefficient distribution and the light intensity distribution in each image capturing condition. The light intensity distribution vector ι is, for example, as in the expression (3), a column vector having a component of a light intensity distribution vector $\iota_k$ obtained on the k-th image capturing condition.

$$\iota = \begin{pmatrix} \iota_1 \\ \iota_2 \\ \vdots \\ \iota_K \end{pmatrix} \quad (3)$$

Herein, when the light intensity distribution $I_k$(x, y) in the k-th image capturing condition has a M×N component, $\iota_k$ is a column vector having a MN×1 component expressed by the following expression (4).

$$\iota_k = \begin{pmatrix} I_k(x_1, y_1) \\ I_k(x_1, y_2) \\ \vdots \\ I_k(x_1, y_N) \\ I_k(x_2, y_1) \\ \vdots \\ I_k(x_M, y_N) \end{pmatrix} \quad (4)$$

The combined image vector s and the noise vector η are also column vectors having MN×1 component, and expressed by the following expressions (5) and (6).

$$s = \begin{pmatrix} s(x_1, y_1) \\ s(x_1, y_2) \\ \vdots \\ s(x_M, y_N) \end{pmatrix} \quad (5)$$

$$\eta = \begin{pmatrix} \eta(x_1, y_1) \\ \eta(x_1, y_2) \\ \vdots \\ \eta(x_M, y_N) \end{pmatrix} \quad (6)$$

The matrix H expresses a combination of the light intensity distribution obtained with the coefficient distribution and each image capturing condition and is a matrix having a MN×KMN component provided by the following expression (7).

$$H = (C_1 \, C_2 \ldots C_K) \quad (7)$$

Herein, $C_k$ is a matrix having MN×MN component expressed by the following expression (8).

$$C_k = \begin{pmatrix} c_k(x_1, y_1) & 0 & 0 & \ldots & 0 & 0 \\ 0 & c_k(x_1, y_2) & 0 & \ldots & 0 & 0 \\ & & \vdots & & & \\ 0 & 0 & 0 & \ldots & 0 & c_k(x_M, y_N) \end{pmatrix} \quad (8)$$

Since this embodiment combines the light intensity distributions on a plurality of image capturing conditions so that they do not have a positional shift, the matrix $C_k$ has only a diagonal component as in the expression (8). However, when the light intensity distributions on a plurality of image capturing conditions are combined with one another with positional shifts, the expression (8) has a finite value in the non-diagonal component according to a positional shift amount.

A description will now be given of a method for obtaining or restoring image (light intensity distribution) data of an object space corresponding to each image capturing condition based on the combined image expressed by the expression (1) or (2). The restoration, as used herein with an example of the expression (2), corresponds to a calculation of the light intensity distribution vector ι corresponding to each image capturing condition based on the combined image vector s and the matrix H. This problem corresponds to solving the simultaneous linear equations, as understood from the expression (1) or (2). While there are KMN unknowns (the number of columns in the light intensity distribution vector ι), there are only MN simultaneous equations (the number of columns in the matrix H). Moreover, when unknown noises are considered, there are (K+1) MN unknowns. Thus, the solution is not uniquely determined, and the estimation process is always necessary so as to obtain the light intensity distribution vector ι.

The image data (estimated image) corresponding to the light intensity distribution vector ι corresponding to each image capturing condition is estimated by solving the optimization problem expressed by the following expression (9).

$$\underset{v}{\operatorname{argmin}}[L(Hv) + \Phi(v)] \quad (9)$$

Herein, v is a vectorized estimated image, L is a loss function, and Φ is a regularization term to the estimated image vector v, and a concrete example of each of them will be described later. The loss function L has an effect of fitting the solution to a model (simultaneous equations of the expression (2)). However, only with the loss function L, the estimated image vector v is the least square solution to the noise and generally significantly deviates from the exact solution. Thus, this embodiment utilizes the regularization term Φ that makes the solution converge on a plausible value. A characteristic of the solution (light intensity distribution vector ι) referred to as prior knowledge is used for the regularization term. The regularization term also serves to prevent excessive fitting associated with only the loss function (reflecting the influence of the noise vector η on the estimated image vector v).

The estimated image vector v is a column vector having a component of an estimated image vector $v_k$ in the k-th image capturing condition, as in the expression (10).

$$v = \begin{pmatrix} v_1 \\ v_2 \\ \vdots \\ v_K \end{pmatrix} \quad (10)$$

When it is assumed that $V_k(x, y)$ is an estimated image in the k-th image capturing condition, $v_k$ is a column vector having a MN×1 component expressed by the following expression (11) similar to the expression (4).

$$v_k = \begin{pmatrix} V_k(x_1, y_1) \\ V_k(x_1, y_2) \\ \vdots \\ V_k(x_M, y_N) \end{pmatrix} \quad (11)$$

Next follows concrete examples of the loss function L and the regularization term Φ in the expression (9). Conceivably, the loss function L is a function expressed by the following expression (12).

$$L(Hv) = 1/2 \|Hv - s\|_2^2 \quad (12)$$

Herein, a symbol p expressed in the expression (13) is a $L_p$ norm, and is a Euclidean norm when p is equal to 2.

$$\|\cdot\|_p \quad (13)$$

An illustrative regularization term Φ is an $L_1$ norm expressed by the following expression (14).

$$\Phi(v) = \lambda \sum_{k=1}^{K} \|\Psi v_k\|_1 \quad (14)$$

Herein, λ is a parameter representing a weight of the regularization term Φ. Ψ is a matrix representing a base transform to the image, such as a Wavelet transform and a discrete cosine transform. The regularization term Φ in the expression (14) has a sparse signal component when the base transform, such as the Wavelet transform and the discrete cosine transform, is performed for the image. In other words, it is expressed by a smaller number of signals, as detailed in Richard G. Baraniuk, "Compressive Sensing," IEEE SIGNAL PROCESSING MAGAZINE [118] JULY 2007.

While the expression (14) uses the same weight λ for each image capturing condition, another embodiment can use a weight that is different according to k.

In addition, a Tikhonov regularization term and TV (Total Variation) norm regularization term expressed by the following expressions (15) and (16) may be used.

$$\Phi(v) = \lambda \|v\|_2^2 \qquad (15)$$

$$\Phi(v) = \lambda \sum_{k=1}^{K} \|\nabla v_k\|_{TV} = \lambda \sum_{k=1}^{K} \sqrt{(\partial_x V_k)^2 + (\partial_y V_k)^2} \qquad (16)$$

Herein, $\partial_x V_k$ and $\partial_y V_k$ are expressed by a primary differential to the x direction and the y direction in the estimated image $V_k$.

In order to solve the estimated expression (9) as the optimization problem, a method using a repetitive calculation may be used, and when the expression (15) is used for the regularization term, a conjugate gradient method etc. may be used. In addition, when the expression (14) or the expression (16) is used for the regularization term, TwIST (Two-step Iterative Shrinkage/Thresholding) etc. may be used. TwIST is described in detail in J. M. Bioucas-Dias et al., "A new TwIST: two-step iterative shrinkage/thresholding algorithms for image restoration," IEEE Trans. on Image Processing, vol. 16, December 2007.

Thus, this embodiment restores the image data that has been obtained with image capturing using the compressive sensing and each image capturing condition.

Figure 1:
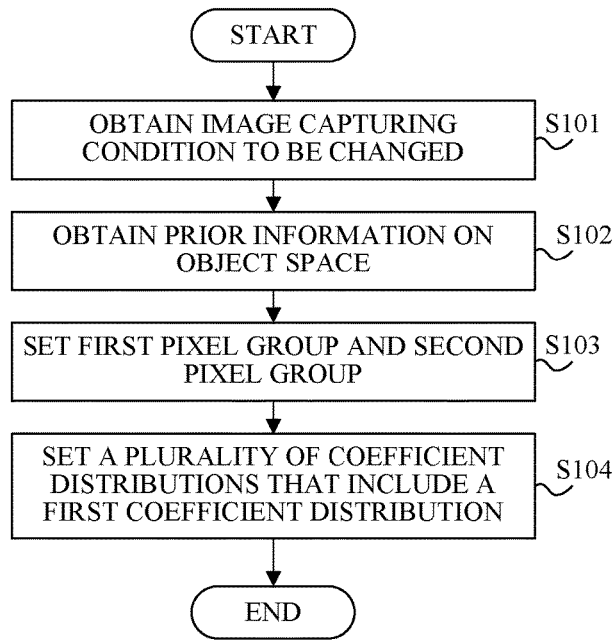
FIG. 1 is a flowchart of a coefficient distribution setting process according to first and fourth embodiments of the present invention.

Referring now to a flowchart illustrated in FIG. 1, a description will be given of a coefficient distribution setting process in the coefficient distribution setter 103 performed prior to image capturing in the image capturing apparatus 100.

In the step S101, the coefficient distribution setter 103 obtains (sets) a plurality of image capturing conditions used to obtain the light intensity distribution data through image capturing. Herein, the coefficient distribution setter 103 may obtain the image capturing condition designated by the user or a known image capturing condition may be automatically obtained. As described above, the image capturing condition is determined by the image capturing parameter, such as an angle of view, time (release timing or a frame of motion image), an exposure value, an exposure time period, an F-number, an in-focus position, a viewpoint, a wavelength of the obtained light intensity distribution, and a polarization. This embodiment obtains a plurality of image capturing conditions in which at least one of the in-focus position and the F-number is different.

In the step S102, the prior information acquirer 104 obtains prior information on the object space corresponding to the image capturing condition set in the step S101. When the variable image capturing parameter is the in-focus position and the F-number, the prior information is information on the distribution of the depth in the object space (referred to as a "depth distribution" hereinafter). Thus, the prior information acquirer 104 includes a scanner type laser distance measuring unit, a TOF (Time of Flight) camera, and a depth information acquiring apparatus, such as a multi-viewpoint image capturing system that can acquire parallax information. The prior information acquirer 104 may obtain two image data with different in-focus positions, and calculate the depth distribution using the DFD (Depth From Defocus). The prior information acquirer 104 may estimate the depth distribution using deep learning based on one image datum obtained by capturing the object space, as detailed in D. Eigen et al., "Depth Map Prediction from a Single Image using a Multi-Scale Deep Network," (http://arxiv.org/pdf/1406.2283.pdf).

The image acquirer 101 can also execute a method for calculating the depth based on the DFF and the deep learning. Thus, in order to use this method, the image acquirer 101 obtains the prior information and the prior information acquirer 104 may not be provided.

A description will be given of the reason why the prior information is the depth distribution. A description will now be given of a case where the image capturing parameter that changes among the plurality of image capturing conditions is the in-focus position.

In each image capturing condition, an object that is not located in an in-focus area or located in a defocus area is captured with blurs. Thus, the information on the defocus area may be obtained with a low resolution. Since the defocus area in a certain capturing condition is an in-focus area in another image capturing condition, a high-frequency component of the object can be obtained in another image capturing condition. Thus, the area in which the object is located may be captured with a high resolution only in the image capturing condition focused on the object. Once the depth information of the object space is known, which area in the object space is focused with which image capturing condition (in-focus position) can be calculated. Thus, the depth distribution can be obtained as prior information.

A description will be given of a case where the image capturing parameter that changes among the plurality of image capturing conditions is the F-number. As the F-number is different, the depth of field and diffraction limit (limit of the available spatial frequency) change. As the F-number reduces, the depth of field becomes shallow and the frequency of the diffraction limit becomes higher. Thus, in the image capturing condition with a small F-number, an area in the depth of field from the in-focus position is an area for which the high-resolution information is to be obtained, and information of another area may have a low resolution. Which area in the object space is the area in the depth of field that contains the in-focus position can be calculated based on the depth distribution. Thus, the depth distribution can be obtained as the prior information.

In the step S103, the coefficient distribution setter 103 as the pixel group setter sets the first pixel group (first pixels) and the second pixel group (second pixels) in the plurality of pixels on the image sensor 101c based on the prior information obtained in the step S102. The first and second pixel groups are pixel groups that are different in resolution used to obtain information (image data) in at least one of the plurality of image capturing conditions.

Figure 5A:
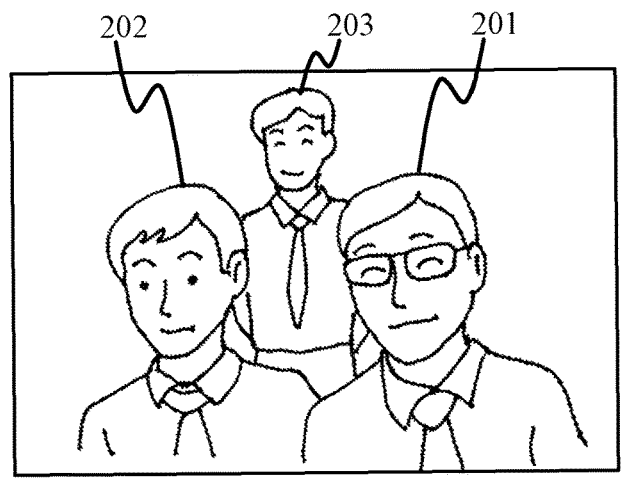
FIGS. 5A and 5B illustrate a relationship between an image capturing scene and settings of a pixel group according to the first embodiment.
Figure 5B:
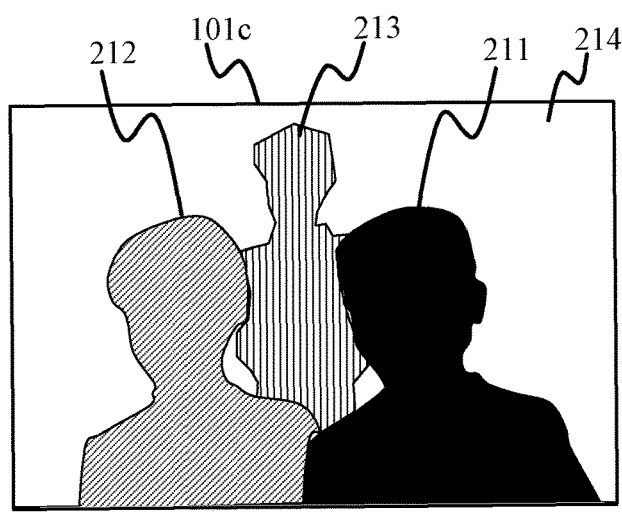

FIG. 5A illustrates one illustrative image capturing scene. In this image capturing scene, a first object 201, a second object 202, and a third object 203 are located in this order from the short-distance side of the image capturing apparatus 100. A description will now be given of a case where the variable image capturing parameter is the in-focus position. Assume that first, second, and third image capturing conditions are in-focus positions of the first, second, and third objects 201, 202, and 203, respectively, and a fourth image capturing condition is the in-focus position of the background position more distant than the third object 203 from the image capturing apparatus 100. In this case, the coefficient distribution setter 103 separates, as illustrated in FIG. 5B, the area of a plurality of pixels (entire pixel area) on the image sensor 101c into four areas or a first area 211 to a fourth area 214. On the first image capturing condition, the information of the first area 211 is obtained with a high resolution. On each of the second to fourth image capturing conditions, information on a corresponding one of the second to fourth areas 212 to 214 is obtained with a high resolution. In other words, on the first image capturing condition, the information on the defocused second to fourth areas 212 to 214 may have low resolutions and this is true of the second to fourth image capturing conditions. While totally four image capturing conditions are used for this example, another total number may be used.

Next follows a description of a case where the variable image capturing parameter is the F-number. On the first image capturing condition with the smallest F-number (or the largest open aperture diameter), only the first object 201 is located in the depth of field (in-focus area). On the second image capturing condition with the next smallest F-number, the first and second objects 201 and 202 are located in the depth of field (in-focus area). On the third image capturing condition with the third smallest F-number, the first, second, and third objects 201, 202, and 203 are located in the depth of field (in-focus area). On the fourth image capturing condition with the largest F-number (or the smallest open aperture diameter), all areas 211 to 214 including the background are located in the depth of field (in-focus area). In this case, on the first image capturing condition, as long as the information on the first area 211 is obtained with a high resolution in FIG. 5B, the other information may have a low resolution. On the second image capturing condition, as long as the information on the first and second areas 211 and 212 is obtained with a high resolution, the other information may have a low resolution. On the third image capturing condition, as long as the information on the first to third areas 211 to 213 are obtained, the background may have a low resolution.

On the other hand, on the fourth image capturing condition, all the objects are located in the depth of field and thus there is no resolution difference of the information to be obtained in the entire pixel area on the image sensor 101c. Since the information on the first object 201 is obtained with a high resolution in the first image capturing condition, it is unnecessary to obtain the information with a high resolution in the fourth image capturing condition. In other words, on the fourth image capturing condition, the information on the first area 211 is obtained with a low resolution, and the low-resolution first area 211 may be replaced with the estimated image corresponding to the first image capturing condition in which the information on the first area 211 has been obtained with a high resolution. Thus, on the fourth image capturing condition, the information of only the fourth area may be obtained with a high resolution. This is also applicable to the second and third areas 212 and 213.

For simplicity, the following description sets the first area 211 to the first pixel group, and the second and fourth pixel areas 212 to 214 to the second pixel group in the entire pixel area. However, only the second area 212 may be set to the second pixel group. The third area 213 may be set to the third pixel group (or third pixels), and the fourth area 214 may be set to the fourth pixel group (or fourth pixels). In this case, the fourth pixel group belong to a white area in FIG. 5B, and separately exists.

In the step S104, the coefficient distribution setter 103 sets the coefficient distribution that is different for each of the plurality of image capturing condition. In this case, the coefficient distribution setter 103 sets, as at least one of the plurality of coefficient distributions corresponding to each of the plurality of image capturing conditions, a first coefficient distribution in which fundamental statistics of a coefficient distribution for the first pixel group and fundamental statistics of a coefficient distribution for the second pixel group are different from each other. The fundamental statistics of the coefficient distribution is at least one of the representative value and the dissemination of the coefficient in the coefficient distribution. The representative value includes an average value, a median, a mode, a weighted average value, etc. The dissemination includes a dispersion, a standard deviation, a contrast ratio (a ratio between the maximum value and the minimum value), etc.

As the representative value (in particular average value) of the coefficient in the coefficient distribution is higher, the resolution of the information improves since more information is obtained in the image capturing conditions corresponding to that coefficient distribution. As the dissemination (in particular dispersion or standard deviation) of the coefficient in the coefficient distribution is higher, the information obtained on the image capturing condition corresponding to the coefficient distribution has a higher resolution. This reason is understandable when the image in each image capturing condition is obtained by solving, through the estimation, the simultaneous linear equations expressed by the expression (2). When the coefficient has a small dispersion, the coefficient distribution includes similar coefficients and the simultaneous equations are less likely independent and are subject to noises. On the other hand, the coefficient with a large dispersion provides a high-resolution estimation since the simultaneous equations are likely independent and less subject to the noises.

A description of a case where the first coefficient distribution is set in the first image capturing condition (specific image capturing condition) in the step S103 in which the in-focus position and the F-umber are different due to the image capturing condition. On the first image capturing condition, the fundamental statistics of the coefficient distribution for the first pixel group (first area 211) is different from the fundamental statistics of the coefficient distribution for the second pixel group (second to fourth areas 212 to 214). More specifically, at least one of the average value and the dispersion of the coefficient in the first pixel group is larger than that in the second pixel groups.

Figure 6:
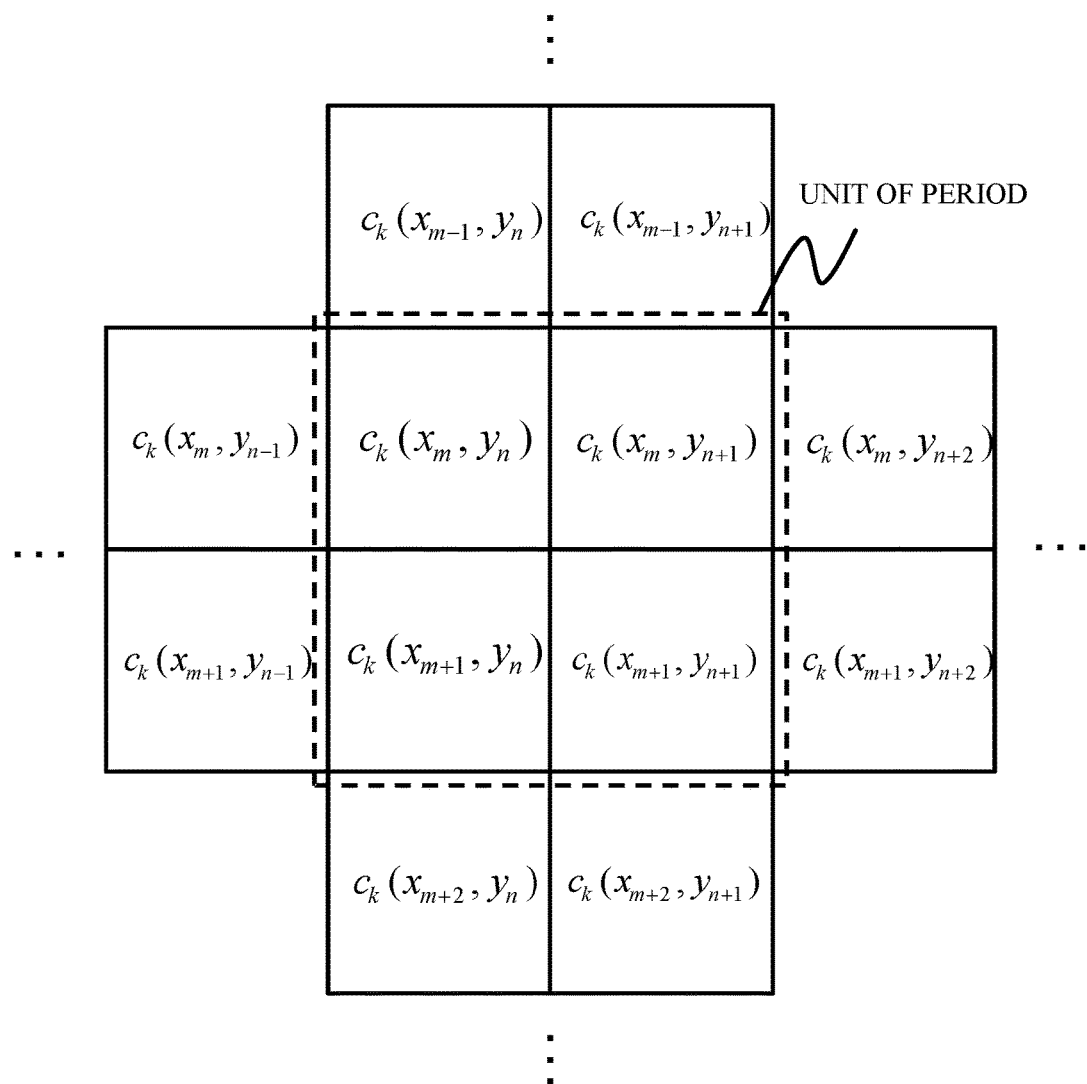
FIG. 6 is a view for explaining a coefficient distribution according to the first embodiment.

Numerical examples will be provided as follows. For simplicity, the first pixel group has a high resolution in the first image capturing condition (and a low resolution in the second to fourth image capturing conditions), and the second pixel group in the first image capturing condition have a resolution similar to that in another image capturing condition. FIG. 6 illustrates a coefficient distribution or a distribution of a coefficient provided for each pixel on the image sensor 101c. A rectangle in FIG. 6 expresses one pixel. Since there are four image capturing conditions or the first to fourth image capturing conditions, the simultaneous linear equations in the expression (2) can be estimated with a high resolution as long as four neighboring pixels have coefficients that are independent of one another. Thus, the coefficient distribution $c_k$ may be the four pixels that are periodically arranged. In the first pixel group, the coefficients of the four pixels are expressed by the following expression (17).

$$C_{4peri} = \begin{pmatrix} 1.000 & 0.5000 & 0.5000 & 0.0000 \\ 0.000 & 1.0000 & 0.5000 & 0.5000 \\ 0.6667 & 0.0000 & 1.0000 & 0.3333 \\ 0.6667 & 0.3333 & 0.0000 & 1.0000 \end{pmatrix} \quad (17)$$

Herein, $C_{4peri}$ is defined as the following expression (18).

$$C_{4peri} = \begin{pmatrix} c_1(x_m, y_n) & c_2(x_m, y_n) & c_3(x_m, y_n) & c_4(x_m, y_n) \\ c_1(x_{m+1}, y_n) & c_2(x_{m+1}, y_n) & c_3(x_{m+1}, y_n) & c_4(x_{m+1}, y_n) \\ c_1(x_m, y_{n+1}) & c_2(x_m, y_{n+1}) & c_3(x_m, y_{n+1}) & c_4(x_m, y_{n+1}) \\ c_1(x_{m+1}, y_{n+1}) & c_2(x_{m+1}, y_{n+1}) & c_3(x_{m+1}, y_{n+1}) & c_4(x_{m+1}, y_{n+1}) \end{pmatrix} \quad (18)$$

A coefficient distribution is set to the first pixel group such that the coefficients in each row in the expression (17) are periodically arranged for each image capturing condition. A coefficient distribution is set to the second pixel group such that the coefficients in each row in the expression (19) are periodically arranged for each image capturing condition.

$$C_{4peri} = \begin{pmatrix} 1.000 & 0.5000 & 0.5000 & 0.0000 \\ 0.000 & 1.0000 & 0.5000 & 0.5000 \\ 0.5000 & 0.0000 & 1.0000 & 0.5000 \\ 0.5000 & 0.5000 & 0.0000 & 1.0000 \end{pmatrix} \quad (19)$$

Assume that among the coefficient distribution $c_k(x_m, y_n)$ set for the k-th image capturing condition, $c_{k,ave}(G_j)$ is an average value of a coefficient corresponding to the j-th pixel group $G_j$ and $c_{k,var}(G_j)$ is a dispersion. Then, $c_{1,ave}(G_1) = 0.5833$ and $c_{1,ave}(G_2) = 0.5000$ from the expressions (17) and (19). In other words, in the first coefficient distribution set for the first image capturing condition, an average value of the coefficient corresponding to the first pixel group $G_1$ is larger than that corresponding to the second pixel group $G_2$. Since $c_{1,var}(G_1) = 0.1319$ and $c_{1,var}(G_2) = 0.1250$, the dispersion of the coefficient for the first pixel group is larger than that for the second pixel group. For simplicity, the average value and the dispersion of the coefficient are calculated by assuming that each of the first and second pixel groups includes a same number of quartet pixels expressed by the expressions (17) and (19). Actually, the quartet (a unit of period) may lack on the boundary of each pixel group, and be slightly different from the above value.

A description will now be given of a condition on which the resolution in the first image capturing condition in the first pixel group is higher than that in the second pixel group. An average ratio is defined as a ratio made by dividing an average value of the coefficient corresponding to each pixel group in the first coefficient distribution set on the first image capturing condition, by an average value of the coefficient corresponding to the same pixel group in the second coefficient distribution set on the other image capturing condition. A dispersion ratio is defined as a ratio made by dividing a dispersion of the coefficient corresponding to each pixel group in the first coefficient distribution, by a dispersion of the coefficient corresponding to the same pixel group in the second coefficient distribution. At this time, the first pixel group and second pixel group may be different in at least one of the average value ratio and the dispersion ratio. In particular, at least one of the average value ratio and the dispersion ratio of the coefficient corresponding to the first pixel group may be larger than those corresponding to the second pixel group. This condition is expressed by the following expressions (20) and (21).

$$\frac{c_{1,ave}(G_1)}{c_{k \neq 1,ave}(G_1)} > \frac{c_{1,ave}(G_2)}{c_{k \neq 1,ave}(G_2)} \quad (20)$$

$$\frac{c_{1,var}(G_1)}{c_{k \neq 1,var}(G_1)} > \frac{c_{1,var}(G_2)}{c_{k \neq 1,var}(G_2)} \quad (21)$$

The coefficients in the expressions (17) and (19) satisfy the expressions (20) and (21) for any values of k.

Since the coefficient in the coefficient distribution does not necessarily have a periodic distribution, it may be generated as a random number. In this case, the coefficients may be set such that the average value or the dispersion of the coefficient as the normal random number in the first image capturing condition for the first pixel group is higher than that for the second pixel group.

Next follows a description of the pixel group includes three pixels. Herein, the first area 211 is set to the first pixel group, the second and third areas 212 and 213 are set to the second pixel group, and the fourth area 214 is set to the third pixel group. The resolution in the first image capturing condition for the first pixel group is higher than that in the other image capturing condition for the first pixel group. The resolution in the first image capturing condition for the second pixel group is equal to that in the other image capturing condition for the second pixel group. The resolution in the first image capturing condition for the third pixel group is lower than that in the other image capturing condition for the third pixel group. For example, the coefficient distribution corresponding to the first pixel group is set to a distribution in which the four coefficients are periodically arranged as in the expression (22).

$$C_{4peri} = \begin{pmatrix} 1.000 & 0.2500 & 0.2500 & 0.0000 \\ 0.000 & 0.7500 & 0.3750 & 0.3750 \\ 0.5000 & 0.0000 & 0.6667 & 0.3333 \\ 0.5000 & 0.3333 & 0.0000 & 0.6667 \end{pmatrix} \quad (22)$$

The coefficient distribution corresponding to the second pixel group is a distribution in which the four coefficients expressed by the following expression (23) are periodically arranged.

$$C_{4peri} = \begin{pmatrix} 0.7500 & 0.3750 & 0.3750 & 0.0000 \\ 0.0000 & 0.7500 & 0.3750 & 0.3750 \\ 0.3750 & 0.0000 & 0.7500 & 0.3750 \\ 0.3750 & 0.3750 & 0.0000 & 0.7500 \end{pmatrix} \quad (23)$$

The coefficient distribution corresponding to the third pixel group is a distribution in which the four coefficients expressed by the following expression (24) are periodically arranged.

$$C_{4peri} = \begin{pmatrix} 0.5000 & 0.5000 & 0.5000 & 0.0000 \\ 0.0000 & 0.7500 & 0.3750 & 0.3750 \\ 0.2500 & 0.0000 & 0.8333 & 0.4167 \\ 0.2500 & 0.4167 & 0.0000 & 0.8333 \end{pmatrix} \quad (24)$$

Since $c_{1,ave}(G_1) = 0.5000$, $c_{1,ave}(G_2) = 0.3750$, and $c_{1,ave}(G_3) = 0.2500$, the coefficient distribution corresponding to the first pixel group has a high average value of the coefficient and the coefficient distribution corresponding to the third pixels has a low average value of the coefficient. Since $c_{1,var}(G_1)=0.1250$, $c_{1,var}(G_2)=0.0703$, and $c_{1,var}(G_3)=0.0313$, the dispersion and the average value are similar. In the coefficient distribution corresponding to the second pixel group, the average value and dispersion of the coefficient in any image conditions are equal to each other, and the resolution of the information obtained in the second pixel group has no difference.

Thus, the coefficient distribution setter 103 completes setting of the coefficient distribution before the image is captured.

Referring now to a flowchart illustrated in FIG. 7, a description will be given of image processing performed by the image processor 102 to generate (restore) the image data in the object space corresponding to the plurality of image capturing conditions based on the combined image after the image is captured.

In the step S201, the information acquirer 102a obtains information of the combined image and the coefficient distribution. As described above, the combined image is a combined image of a plurality of light intensity distribution data obtained by applying the different coefficient distributions to the light intensity distributions obtained with the plurality of image capturing conditions.

In the step S202, the image estimator 102b sets a parameter used for the estimation. The parameter includes a determination and weight of the regularization term used for the expression (9), the number of repetitive calculations, a convergence condition used for the step S204, etc. The image estimator 102b may designate the number of image capturing conditions used to generate the image through the estimation.

In the step S203, the image estimator 102b generates, through the estimation, the image (light intensity distribution) data corresponding to each of the plurality of image capturing conditions based on the combined image. In other words, the image estimator 102b estimates image data corresponding to each image capturing condition. The image data is generated by this estimation (referred to as an "estimated image" hereinafter) by solving the optimization problem in the expression (9).

In the step S204, the image estimator 102b determines whether the estimation in the step S203 has converged. When it has converged, the flow moves to the step S205, and when it has not yet converged, the flow returns to the step S203. The convergence is determined, for example, based on whether a predetermined number of repetitive calculations have been performed in the step S203, whether a change width of the estimated image updated by the repetitive calculations has become lower than a predetermined value, etc. When the convergence condition is not satisfied, the image estimator 102b increases the number of repetitive calculations in the step S203, and generates the generated image.

In the step S205, the image generator 102c outputs as an output image the estimated image corresponding to each image capturing condition generated by the image estimator 102b. Next follows an illustrative application of the output image but the application is not limited to this example. For example, a pan-focus image can be generated by combining only in-focus areas among the plurality of estimated images with different in-focus positions. In addition, this embodiment can serve to adjust the depth of field even after the image is captured by displaying the estimated image (output image) corresponding to the F-number designated by the user among the plurality of estimated images with different depths of field.

The above image processing can generate a plurality of estimated images (and output images) that contain high-resolution information obtained in each of a plurality of image capturing conditions, based on the combined image obtained with the image sensor 101c.

Next follows a description of the condition(s) to be satisfied by this embodiment. The fundamental statistics of a coefficient distribution for the first pixel group and that for the second pixel group in the first coefficient distribution are different from each other by an amount at least one-tenth as large as a smaller one of these fundamental statistics. This configuration can improve the resolution for the area in which the high-resolution information is acquired. The fundamental statistics of a coefficient distribution for the first pixel group and that for the second pixel group in the first coefficient distribution are different from each other by an amount at least two-tenths as large as a smaller one of these fundamental statistics. This configuration can further improve the resolution for the area in which the high-resolution information is acquired.

The fundamental statistics in the first coefficient distribution corresponding the first and second pixel groups may be an average value or dispersion of a coefficient.

The number of pixels contained in each of the first and second pixel groups may be one-tenth as large as the total pixel number on the image sensor 101c or more. Estimating a certain pixel in the image data corresponding to each image capturing condition in the step S203 requires information of the pixel and surrounding pixels in the combined image located at the position corresponding to the certain pixel. Unless the area used to obtain the information with a high resolution has pixels to some extent, the information of the surrounding pixels has a low resolution and it is difficult to estimate a high-resolution image. The pixel number contained in each of the first and second pixel groups may be two-tenths as large as the total pixel number on the image sensor 101c or more.

Assume that the average value of the coefficient corresponding to the first pixel group in the first coefficient distribution as one of the plurality of coefficient distributions is larger than that corresponding to the second pixel group. Then, an average value of a coefficient corresponding to a second pixel group in at least one second coefficient distribution that is different from the first coefficient distribution among the plurality of image capturing conditions may be larger than that corresponding to the first pixel group. This is the condition necessary to prevent a light amount obtained by each pixel in the first and second pixel groups from significantly fluctuating.

That the average value of the coefficient corresponding to the first pixel group in the first coefficient distribution is larger than that corresponding to the second pixel group means that the first pixel group receives a larger light amount. In this case, there is a difference between the light amounts obtained by the first and second pixel groups, and the luminance saturation and crushed black are likely to occur. Thus, so as to cancel this light amount difference, the average value of the coefficients corresponding to the second pixel group in the second coefficient distribution may be larger than that corresponding to the first pixel group.

For example, in the coefficient distributions expressed by the expressions (17) and (19), the average values of the coefficients corresponding to the first and second pixel groups are $c_{2,ave}(G_1)=0.4583$ and $c_{2,ave}(G_2)=0.5000$ in the coefficient distribution (second coefficient distribution) set on the second image capturing condition. This is true of the coefficient distribution (also referred to as the "second coefficient distribution") on the fourth image capturing condition. Thus, a magnitude relationship of the average values of the coefficient corresponding to the first and second pixel groups in the second coefficient distribution set on the second and fourth image capturing conditions is inverse to that in the first coefficient distribution set on the first image capturing condition.

The coefficient distribution may be set so as to satisfy the following expression (25).

$$0.5 < \frac{c_{ave}(G_1)}{c_{ave}(G_2)} < 2 \qquad (25)$$

Herein, $c_{ave}(G_j)$ is expressed by the following expression (26).

$$c_{ave}(G_j) = \frac{1}{L_j} \sum_{i \in G_j} \sum_{k=1}^{K} c_k(p_i) \qquad (26)$$

In the expression (26), $p_i$ is an i-th pixel on the image sensor 101c, $c_k(p_i)$ is a coefficient corresponding to the pixel $p_i$ in the coefficient distribution in a k-th image capturing condition, $L_1$ is the number of pixels included in the first pixel group, and $L_2$ is the number of pixels included in the second pixel group.

The expression (25) expresses a difference between a light amount obtained in the first pixel group and a light amount obtained in the second pixel group. As the value of the expression (25) becomes closer to 1, a light amount difference becomes smaller. When the value exceeds the upper and lower limits, the light amount difference becomes larger and the luminance saturation and the crushed black are likely to occur.

The condition of the following expression (25a) can more effectively restrain the luminance saturation and the crushed black.

$$0.75 < \frac{c_{ave}(G_1)}{c_{ave}(G_2)} < 1.5 \qquad (25a)$$

The coefficient corresponding to the first pixel group and the coefficient corresponding to the second pixel group in the first coefficient distribution may have average values different from each other and dispersions different from each other. This configuration can improve the resolution of information obtained in the area used to acquire the information with a high resolution.

Next follows a description of a case where the variable image capturing parameter is only the F-number. Where the in-focus position is the first object 201 in FIG. 5A, almost the same first object 201 is observed in each image capturing condition. Strictly speaking, the frequency of the diffraction limit is different for each image capturing condition, but the difference is small unless the F-number is made extremely high. Hence, it is useless to obtain the light intensity distribution in a plurality of image capturing conditions for the first object 201. An image area used to obtain the light intensity distribution equivalent with (common to) each image capturing condition like the first object 201 in this case will be referred to as the same intensity area, and the pixel group on the image sensor 101c corresponding to the same intensity area will be referred to as the same intensity pixel group.

Since it is unnecessary to separate the combined image into a plurality of image data in the same intensity area, the same intensity area may be cut directly out of the combined image without the estimation process descried in the step S203 and may be inserted into image data corresponding to each image capturing condition. This configuration can reduce a load necessary for the estimation process.

Since the coefficient distribution is applied to the light intensity distribution in each image capturing condition, the brightness of the same intensity area generally scatters for each pixel. However, since each coefficient in the coefficient distribution is known, a correct light intensity distribution can be obtained by calculating and correcting for each pixel a scattering amount of this brightness. In addition, the coefficient distribution may be set so as to satisfy the following expression (27).

$$0.9 \leq \frac{\min_{p_i \in G_{same}} c_{ksum}(p_i)}{\max_{p_i \in G_{same}} c_{ksum}(p_i)} \leq 1.0 \qquad (27)$$

Herein, $c_{ksum}(p_i)$ is a total coefficient distribution as a sum of the plurality of coefficient distributions set on the plurality of image capturing conditions, and expressed by the following expression (28).

$$c_{ksum}(p_i) = \sum_{k=1}^{K} c_k(p_i) \qquad (28)$$

In the expression (27), $G_{same}$ represents the same intensity pixel group on the image sensor 101c, and max and min represent a maximum value and a minimum value. The expression (27) provides a condition necessary to restrain the brightness for each pixel from scattering due to the application of the coefficient distribution. This configuration makes unnecessary the correction process of the brightness. The same intensity pixel group (same intensity area) is a pixel group (area) that can be identified from the prior information, and a difference among the light intensity distributions obtained on the plurality of image capturing conditions is smaller than a threshold. When the value is lower than the lower limit in the expression (27), the brightness significantly scatters and the correction process is necessary. The value cannot theoretically exceed the upper limit.

The condition expressed by the following expression (27a) can more effectively restrain the brightness from scattering.

$$0.95 \leq \frac{\min_{p_i \in G_{same}} c_{ksum}(p_i)}{\max_{p_i \in G_{same}} c_{ksum}(p_i)} \leq 1.00 \qquad (27a)$$

In the step S203, the image estimator 102b solves the simultaneous linear equations in the equations (2) through the estimation expressed by the expression (9). Thus, the estimation has a higher precision as the number of independent equations increases in the simultaneous linear equations. Therefore, a vector having a component of a coefficient for each k (image capturing condition) applied to a certain pixel $p_i$, $=(x_m, y_n)$ (i=1 . . . MN, m=1 . . . M, n=1 . . . N) may be linearly independent of a similar vector in each pixel around the certain pixel. Since the coefficient distribution expresses the coefficients in the simultaneous linear equations, this vector will be referred to as a "coefficient vector" and E is set to a matrix in which coefficient vectors (row vectors) are arranged. In order to improve the estimation precision of the estimated image, the matrix E may satisfy the condition of the following expression (29).

$$0.5 \leq \frac{1}{K} rankE \leq 1 \quad (29)$$

Where "a" is defined as the following expression (30), the matrix E is expressed by the following expression (31).

$$a = \text{ceil}\left(\frac{\text{ceil}(\sqrt{K})-1}{2}\right) \quad (30)$$

$$E = \begin{pmatrix} c_1(x_{m-a}, y_{n-a}) & c_2(x_{m-a}, y_{n-a}) & \cdots & c_K(x_{m-a}, y_{n-a}) \\ c_1(x_{m-a}, y_{n-a+1}) & c_2(x_{m-a}, y_{n-a+1}) & \cdots & c_K(x_{m-a}, y_{n-a+1}) \\ \vdots & \vdots & & \vdots \\ c_1(x_{m-a}, y_{n+a}) & c_2(x_{m-a}, y_{n+a}) & \cdots & c_K(x_{m-a}, y_{n+a}) \\ \vdots & \vdots & & \vdots \\ c_1(x_m, y_n) & c_2(x_m, y_n) & \cdots & c_K(x_m, y_n) \\ \vdots & \vdots & & \vdots \\ c_1(x_{m+a}, y_{n+a}) & c_2(x_{m+a}, y_{n+a}) & \cdots & c_K(x_{m+a}, y_{n+a}) \end{pmatrix} \quad (31)$$

Herein, "ceil" in the expression (30) represents a ceiling function. The matrix E is a matrix that includes coefficients in each linear equation (thus, E is a 9×4 matrix in this embodiment). In other words, as the number of stages in the matrix E becomes closer to the number of unknowns K (except for noises) per one pixel, the estimation precision improves. Hence, the coefficient distribution may be a distribution that satisfies the condition in the expression (29) for all the pixels $p_i=(x_m, y_n)$.

The condition in the expression (29a) may be satisfied.

$$0.7 \leq \frac{1}{K} rankE \leq 1 \quad (29a)$$

Alternatively, the condition in the expression (29b) may be satisfied.

$$0.9 \leq \frac{1}{K} rankE \leq 1 \quad (29b)$$

A minimum value of the total coefficient distribution $c_{ksum}(p_i)$ may be larger than 0. Light does not enter the pixel $p_i=(x_m, y_n)$ at all that provides the total coefficient distribution $c_{ksum}(p_i)$ with a value of 0. Obtaining the estimated image vector v means estimating the solution of the simultaneous linear equations, as described above. When there is a pixel which the light does not enter, all coefficients $c_k$ in the linear equations become 0 in that pixel and thus the number of simultaneous linear equations reduces. Thus, the minimum value of the total coefficient distribution may be larger than 0 so that the number of linear equations does not reduce.

The estimation in the step S203 may be based on the prior information. The prior information provides the information on which area in the image data obtained on each image capturing condition is the same as the image data obtained on another image capturing condition and the information on whether only the low frequency exists. The estimation incorporated with this information becomes highly precise. All $v_k$ are commonly used for the areas in which the image does not change according to the image capturing condition so as to reduce the number of variables. In addition, a regularization term that smoothly changes the image may be provided to the area in which only the low frequency exists.

This embodiment can provide an image capturing apparatus that can obtain high-resolution information on an object space with the smaller number of observations.

Second Embodiment

A description will now be given of the image capturing system according to a second embodiment. This embodiment uses release timing (or a frame in a motion image), an exposure time period (shutter speed), and an angle of view for the variable image capturing parameter.

Figure 8A:
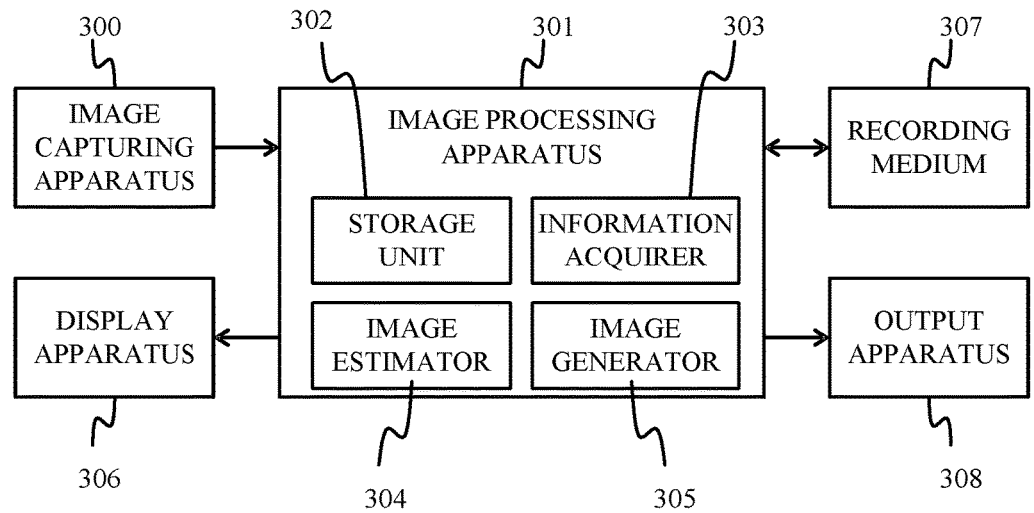
FIG. 8A is a block diagram of a configuration of an image capturing apparatus according to the second embodiment.
Figure 8B:
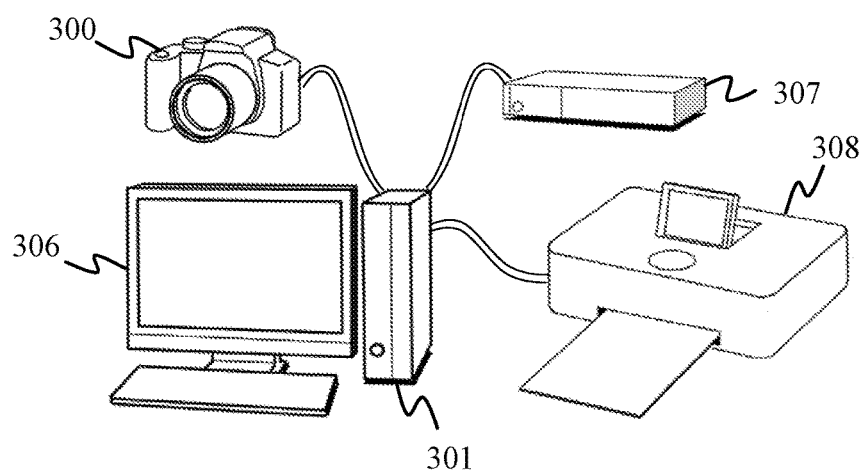
FIG. 8B is an overview of the image capturing apparatus according to the second embodiment.

FIG. 8A illustrates a basic configuration of the image capturing system according to this embodiment. FIG. 8B illustrates an overview of the image capturing system. The image capturing system includes an image capturing apparatus 300 configured to generate a combined image, and an image processing apparatus 301 configured as an apparatus separate from the image capturing apparatus 300 and to generate (estimate) image data obtained on each of the plurality of image capturing conditions based on the combined image.

The image capturing apparatus 300 has the same basic configuration as that illustrated in FIG. 3A. Since the image acquirer 101 obtains the prior information on the object space in the second embodiment, the prior information acquirer 104 is not provided. A configuration of the image acquirer 101 will be described later.

The storage unit 302 in the image processing apparatus 301 stores information on the combined image generated through image capturing in the image capturing apparatus 300 and the coefficient distribution applied for each image capturing condition when the image is captured. When the combined image is processed by the image acquirer 303, the image estimator 304, and the image generator 305, image data is generated for each of the plurality of image capturing conditions. The generated image data is output to at least one of the display apparatus 306, the recording medium 307, and the output apparatus 308. The display apparatus 306 corresponds to a liquid crystal display, a projector, etc. The user can select processing while viewing the image that is being processed via the display apparatus 306. The recording medium 307 corresponds to a semiconductor memory, a hard disk drive, a network server, etc. The output apparatus 308 corresponds to a printer, etc. The image processing apparatus 301 may serve to perform a development process and other image processing if necessary.

Figure 9:
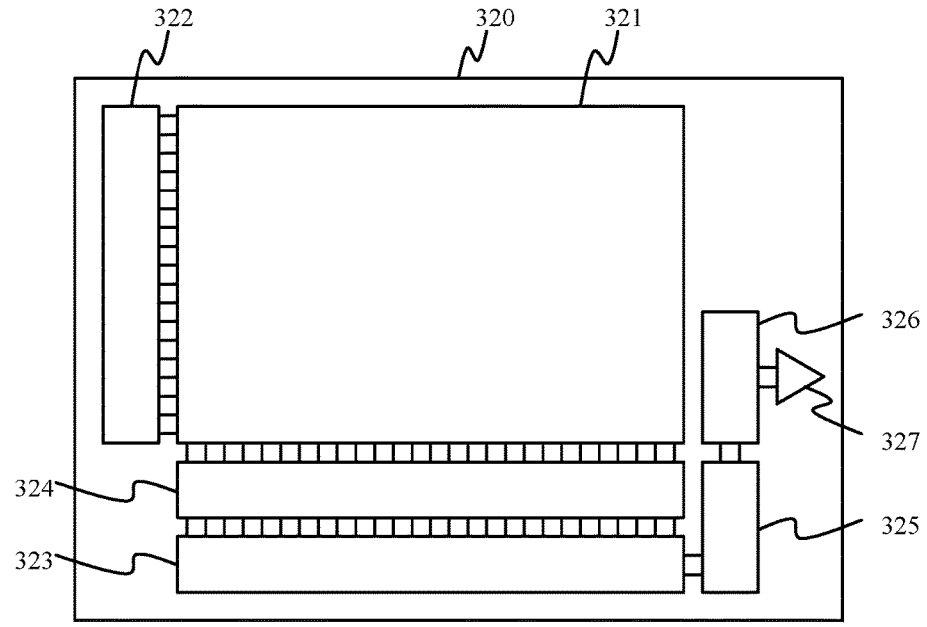
FIG. 9 illustrates a configuration of an image sensor according to the second embodiment.
Figure 10:
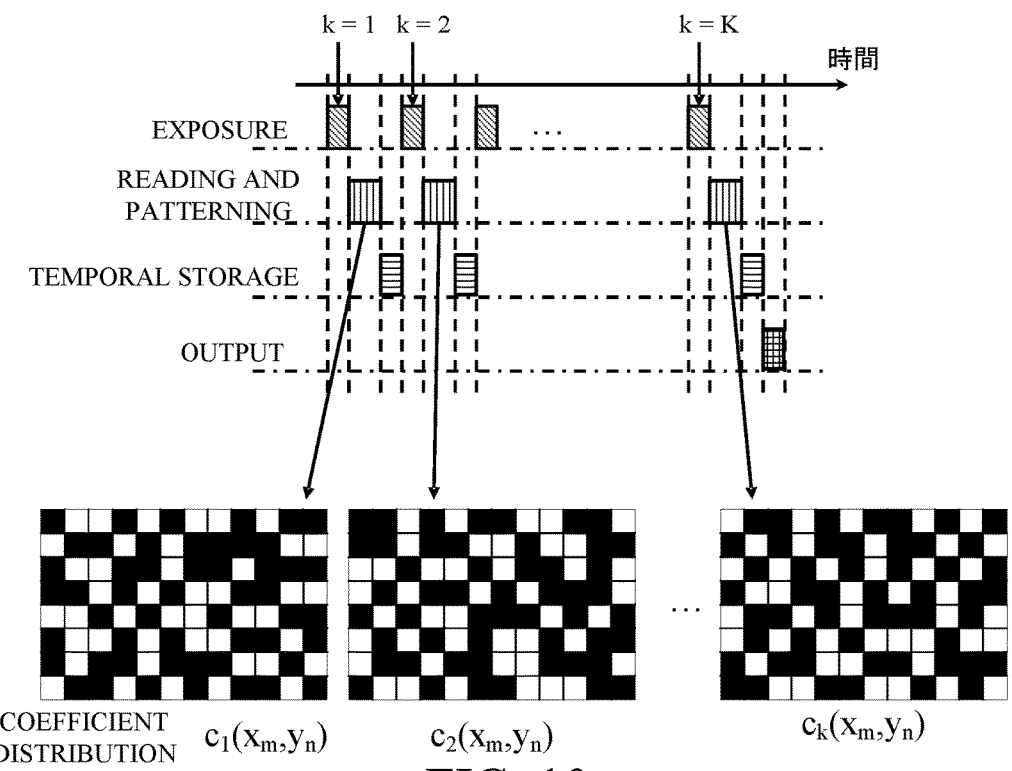
FIG. 10 is a flowchart illustrating an operation of an image sensor according to the second embodiment.

A detailed description will be given of the image acquirer 101. In this embodiment, the imaging optical system 101a is a zoom lens having a magnification variation function. An image sensor 320 includes a CMOS sensor structure, as illustrated in FIG. 9, and a signal selector 325 serves as the coefficient distribution applier 101b illustrated in FIG. 3A. The image sensor 320 operates in accordance with a timing chart illustrated in FIG. 10. A plurality of pixels are arranged in the pixel arrangement unit 321. Light entering each pixel in the exposure time period is converted into an analog electric signal by the photoelectric converter in the pixel. Each pixel includes a global electronic shutter, and can provide exposure at the same time. A vertical scanning circuit unit 322 and a horizontal scanning circuit unit 323 read a signal out of each pixel and an AD converter 324 converts an analog signal into a digital signal in the readout.

The digital signal is input to the signal selector 325, and patterned (or selected) in accordance with a position of the pixel from which the signal is read. The patterning means applying the coefficient distribution $c_{k=1}(x_m, y_n)$ of 0 or 1 to the light intensity distribution in the object space. The signal selector 325 may calculate the signal such as multiplying the signal by a proportional ratio in addition to selecting the signal (multiplying the signal by 0 or 1). The storage unit 326 temporarily stores the patterned digital signal (light intensity distribution data).

The signal selector 325 provides similar patterning to the next image capturing condition. In this case, the signal selector 325 with the coefficient distribution ($c_2$ in FIG. 10) different from $c_1(x_m, y_n)$. The patterned image data is combined with (added to) the image data previously stored in the storage unit 326. Thus, a data amount of the image data does not increase. The signal selector 325 repeats the patterning a predetermined number of times corresponding to the number of image capturing conditions, generates the combined image by combining a plurality of pieces of information about the light intensity distributions obtained on the respective image capturing conditions, and the output unit 327 outputs it to the outside, such as the image processing apparatus 301. When an exposure time period is changed for each image capturing condition, an "exposure" time period illustrated in FIG. 10 differs according to k.

The signal selector 325 sets a coefficient distribution for each image capturing condition before the image is captured. While the coefficient distribution is set as explained with reference to the flowchart in FIG. 1 according to the first embodiment, this embodiment is different from the first embodiment in variable image capturing parameter.

In the step S101, the signal selector 325 obtains (sets) a plurality of image capturing conditions used to obtain the light intensity distribution data through image capturing. As described above, this embodiment uses the release timing, the exposure time period, and the angle of view for the variable image capturing parameter. However, in this example, the angle of view relates only to a change of an image capturing magnification. Another change of the angle of view will be described at the end of this embodiment.

In the step S102, the image acquirer 101 obtains the prior information on the object space corresponding to the image capturing condition set in the step S101. The prior information includes information on a distribution of an edge of the object space (referred to as an "edge distribution" hereinafter) where the angle of view is different for each image capturing condition. Where the release timing or the exposure time period is different for each image capturing condition, the prior information is information on a distribution of a motion in the object space relative to the image capturing apparatus 300 (referred to as a "motion distribution" hereinafter). Where the angle of view and the exposure time period are simultaneously changed, the prior information needs information representing both of the edge distribution and the motion distribution. The edge of the object space means part in which the value of the light intensity significantly changes, such as a boundary between different objects. In acquiring the prior information, the image sensor 320 operates while K=1 and the coefficient distribution $c_{k=1}(x_m, y_n)$ is totally set to 1, and obtains the image data. In other words, the coefficient distribution is not applied, or the light intensity distribution data obtained on the plurality of image capturing conditions are not summed up. The information on the edge distribution can be obtained by applying a differential filter to the obtained image data, and the information representing the motion distribution can be calculated from a plurality of image data obtained in a timewise continuous manner.

Figure 11:
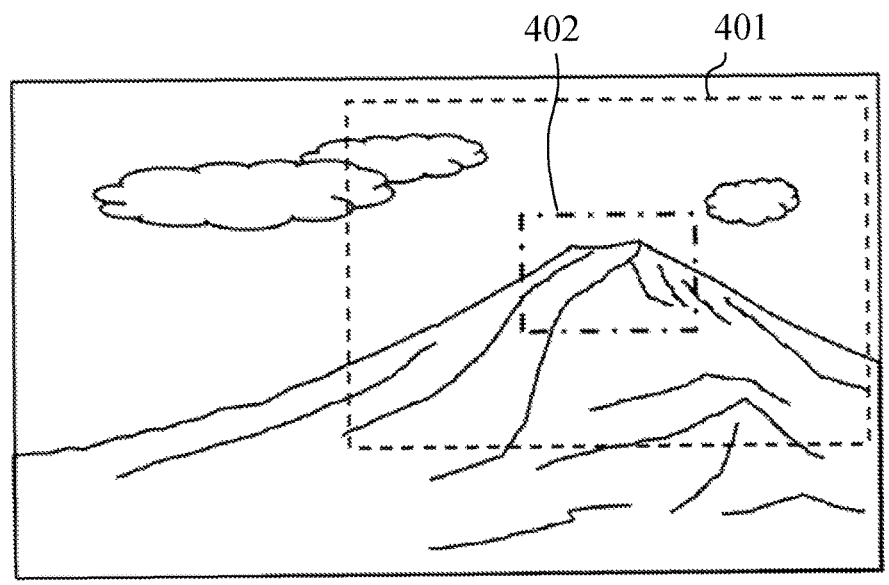
FIG. 11 illustrates an image capturing scene according to the second embodiment.
Figure 12A:
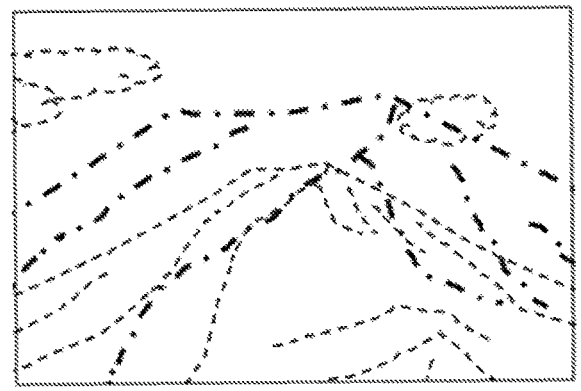
FIGS. 12A and 12B illustrate a relationship between the image capturing scene and settings of a pixel group according to the second embodiment.

A description will now be given of a reason why the prior information obtained where the angle of view is different for each image capturing condition is the information representing the edge distribution. For example, assume an image capturing scene that contains a mountain and a sky as illustrated in FIG. 11. A broken-line rectangle represents an image capturing area 401 on the wide-angle end in the image capturing optical system 101a, and a thick alternate long and short dash line represents an image capturing area 402 on the telephoto end in the image capturing optical system 101a. When the coefficient distribution is ignored, the combined image is as illustrated in FIG. 12A. For better understanding, FIG. 12A illustrates the light intensity distribution on the wide-angle end with a broken line and the light intensity distribution on the wide-angle end with a thick alternate long and short dash line. The sky exists on the wide-angle end near the summit on the telephoto end. In other words, there is no edge (containing the texture). Thus, the area in which the sky is captured on the wide-angle end may have a low resolution, and the resolution on the telephoto end can improve by setting the area on the wide-angle end to the low resolution. This configuration can obtain high-resolution information of the surface of the mountain near the summit on the telephoto end.

Next follows a description of a case where the release timing differs for each image capturing condition. In this case, a difference of an object space optical image formed for each image capturing condition is an object area in the object space which moves relative to the image capturing apparatus 300, and thus the information near the moving object area is obtained with a high resolution. Thus, the prior information is information representative of the motion distribution in the object space relative to the image capturing apparatus 300. More specifically, the prior information is the information on the speed (speed and direction) at each position in the object space. The speed is a relative speed to the image capturing apparatus 300 in a static coordinate system used for the image capturing apparatus 300 to observe the object space. The object area that is moving when the image is captured and its speed are estimated based on the motion information before the image is captured.

Next follows a description of a case where the exposure time period (shutter speed) is different for each image capturing condition. Even in this case, a difference of the object space optical image formed for each image capturing condition is the object area in the object space which is moving relative to the image capturing apparatus 300. Thus, similar to a case where the release timing is different, the prior art includes the information representing the motion distribution in the object space relative to the image capturing apparatus 300.

In the step S103, the signal selector 325 sets the first pixel group and the second pixel group in the plurality of pixels on the image sensor 320 based on the prior information obtained in the step S102. Where the angle of view is different for each image capturing condition as illustrated in FIG. 11, the pixel group in the first area (white part containing the cloud area) 411 is set to the first pixel group, and the pixel group in the second area (black part) 412 is set to the second pixel group. Where the release timing or the exposure time period is different for each image capturing condition, the area that moves over time (moving object area) and the area that does not move are separated and corresponding pixel groups are set to the first and second pixel groups.

Figure 12B:
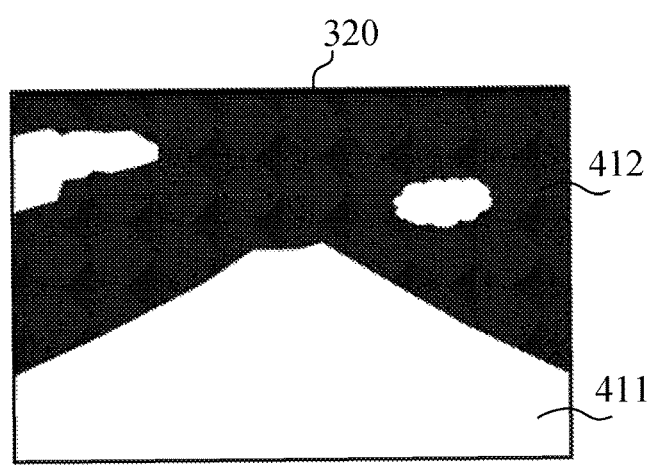

In the step S104, the signal selector 325 sets the coefficient distribution that is different for each of the plurality of image capturing condition. Where the angle of view is different for each image capturing condition as illustrated in FIG. 11, the coefficient distribution (first coefficient distribution) on the wide-angle end is set such that the average value or dispersion of the coefficient corresponding to the first area (first pixel group) 411 in FIG. 12B is larger than that corresponding to the second area (second pixel group) 412.

Figure 7:
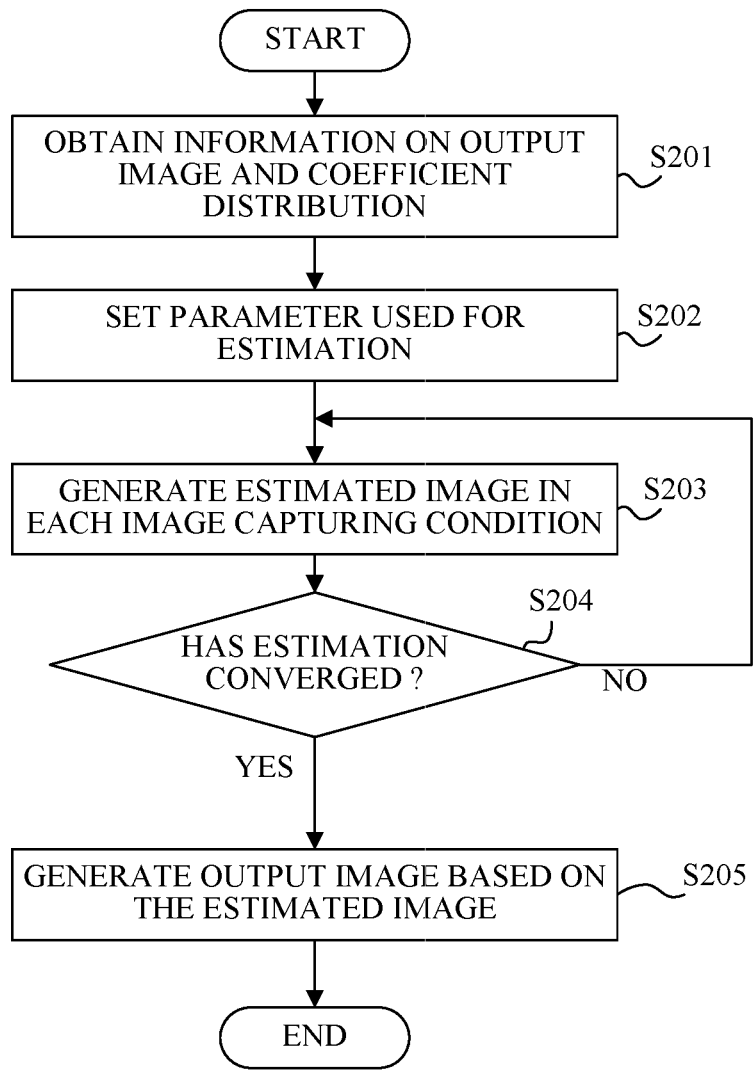
FIG. 7 is a flowchart illustrating an image data generating process obtained on each image capturing condition according to the first to fourth embodiments.

The image processing generates (restores) image data on each of the image capturing conditions based on the combined image after the image is captured as illustrated in the flowchart in FIG. 7 according to the first embodiment. When the release timing (or frame in the motion image) is different for each image capturing condition, high-speed image capturing is available without lowering a received light amount of the image sensor 320 (or without lowering the S/N ratio). When the exposure time period or angle of view (image capturing magnification) is different for image capturing condition, the user can obtain image data as if the shutter speed and zooming are changed after the image is captured.

Figure 13:
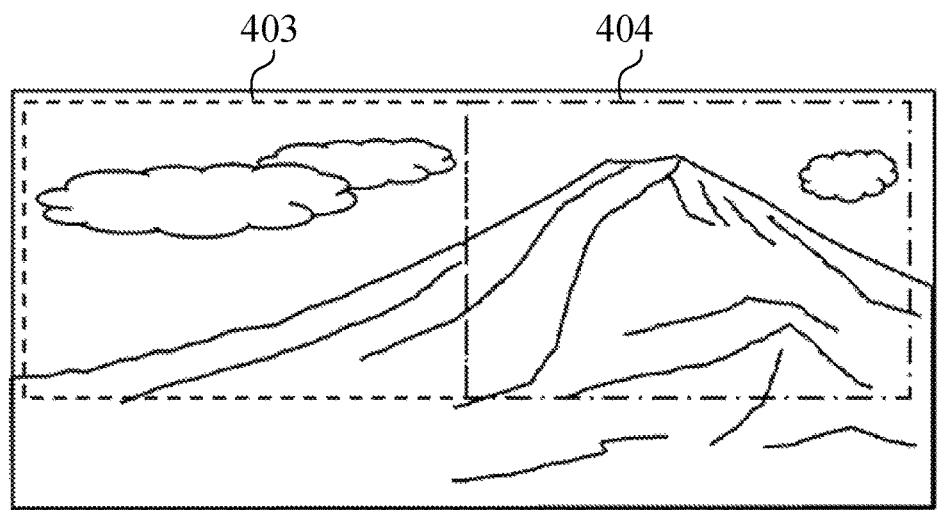
FIG. 13 illustrates another image capturing scene according to the second embodiment.
Figure 14A:
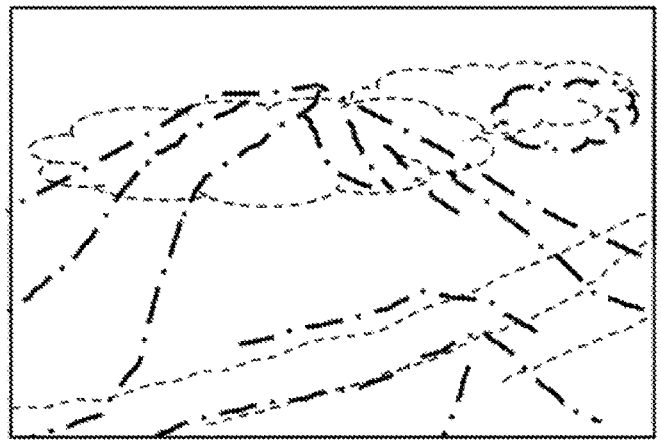
FIGS. 14A and 14B illustrate a relationship between the image capturing scene and settings of a pixel group according to the second embodiment.
Figure 14B:
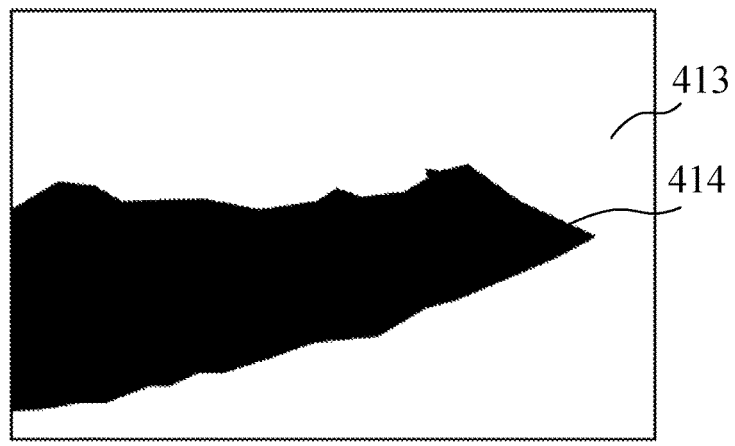

For the angle of view, the position in the object space to be captured (image capturing area) may be changed rather than the image capturing magnification. FIGS. 13, 14A, and 14B illustrate that embodiment. The image capturing scene illustrated in FIG. 13 is captured by setting first and second image capturing areas 403 and 404 to a plurality of angles of view (image capturing conditions). The combined image generated herein is as illustrated FIG. 14A when the coefficient distribution is ignored. FIG. 14A illustrates the objects in the first and second image capturing areas 403 and 404 with a broken line and a thick alternate long and short dash line. Similar to the case where the image capturing magnification is changed, for example, even this embodiment identifies the object area having no edges (or flat object area) in the first image capturing area 403 and the object area having an edge in the second image capturing area 404, based on the information representing the edge distribution.

FIG. 14B illustrates the result. In the first image capturing area 403, the first area 413 is set to the first pixel group and the second area 414 is set to the second pixel group. The first coefficient distribution for the first image capturing area 403 is set such that the average value or dispersion of the coefficient corresponding to the first pixel group is larger than that corresponding to the second pixel group.

The image data of the different image capturing area generated based on the combined image can be used to generate a panoramic image, etc.

In changing the image capturing area, a unit for changing the image capturing area is necessary. For instance, the image capturing area may be changed with a mechanism configured to pan, tilt, or shift the image capturing apparatus 300 (image acquirer 101) or by moving a reflective member disposed in front of the image capturing apparatus 300. The prior information (information of the edge distribution) may be acquired by the image acquirer 101 or by an image capturing apparatus with an angle of view wider than the image capturing apparatus 300.

This embodiment can provide an image capturing system that can obtain high-resolution information on the object space with the smaller number of observations.

Third Embodiment

A description will be given of an image capturing apparatus according to a third embodiment of the present invention. This embodiment uses a viewpoint (observing point) for a variable image capturing parameter.

Figure 15:
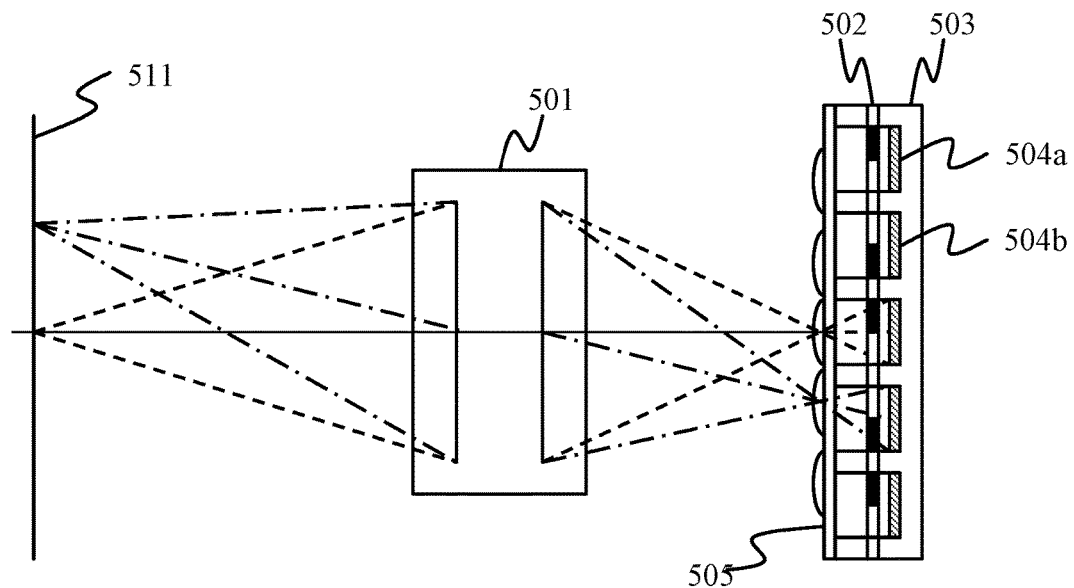
FIG. 15 illustrates a configuration of an image acquirer according to the third embodiment.

A basic configuration of the image capturing apparatus according to this embodiment is the same as that illustrated in FIG. 3 according to the first embodiment except for the image acquirer 101, and a description of the common components will be omitted. In this embodiment, the image acquirer 101 has a configuration illustrated in FIG. 15, and can simultaneously obtain light intensity distributions from a plurality of different viewpoints. The image sensor 503 includes a photoelectric converter 504 (504a, 504b, . . . ) configured to constitute a plurality of pixels, and a micro lens array 505. The micro lens array 505 and the object surface 511 are optically conjugate with each other by the imaging optical system 501. Moreover, the pupil in the imaging optical system 501 and the photoelectric converter 504 (504a, 504b, . . . ) are approximately conjugate with each other by the micro lens array 505.

Figure 16:
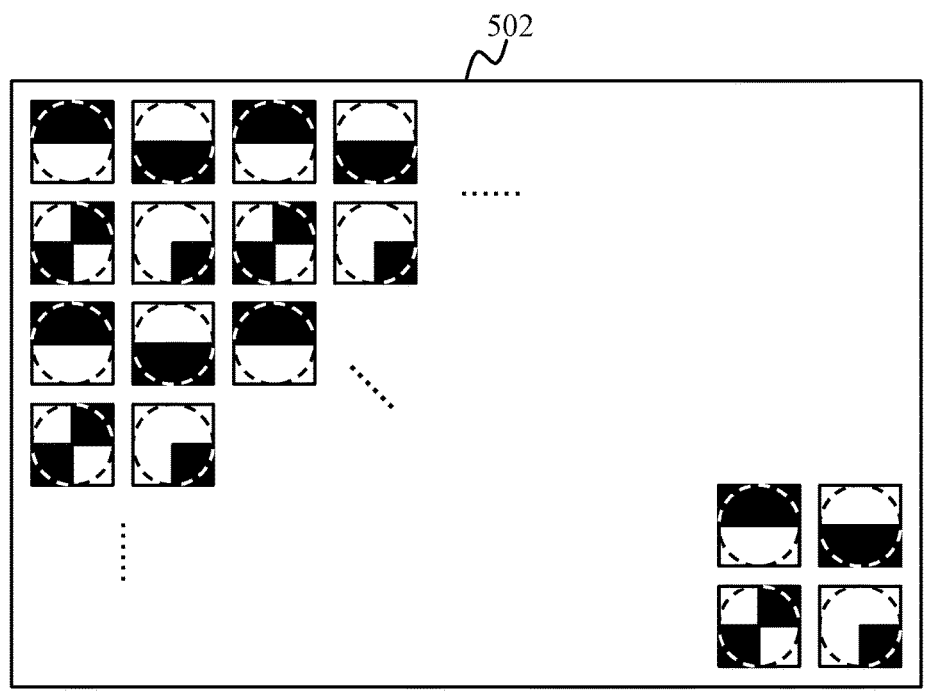
FIG. 16 illustrates a configuration of a coefficient distribution applier according to the third embodiment.

The coefficient distribution applier 502 is disposed between the micro lens array 505 and the photoelectric converter 504 (504a, 504b, . . . ). The coefficient distribution applier 502 can use the SLM, etc. similar to the first embodiment. FIG. 16 illustrates the configuration of the coefficient distribution applier 502 according to this embodiment. The coefficient distribution applier 502 includes a light transmitter and a light shield. The light shield is a black part illustrated in FIGS. 15 and 16. The coefficient distribution applier 502 shields an area for light through the light shield that would otherwise enter each pixel on the image sensor 503, as illustrated in FIG. 16. A circle drawn by a broken line in FIG. 16 represents an image of a pupil (assembled pupil) in the imaging optical system 501 formed on each pixel. As understood from FIG. 16, the coefficient distribution applier 502 provides a coefficient different according to the position in the assembled pupil (position of the partial pupil) for each pixel. In this embodiment, the coefficient may be 0 or 1, but another coefficient may be used.

Next follows a description of the combined image obtained by the image sensor 503 according to this embodiment. The assembled pupil in the imaging optical system 501 is divided into four or 2×2 partial pupils in this embodiment. The number of divisions is merely illustrative and another division number may be used. A description will be given of a lower right partial pupil viewed from the object space among the four divided partial pupils by an example.

The optical image when the object space is observed from the lower right partial pupil can be reproduced by gathering only light that passes the partial pupil. An image of the assembled pupil inversely formed on the photoelectric converter becomes light that enters the upper left in each pixel in FIG. 16. The coefficient distribution $c_k(x, y)$ provided by the coefficient distribution applier 502 to this optical image or the light intensity distribution is an array of coefficients located at the upper left in each pixel in FIG. 16. This is true of another partial pupil (viewpoint), and the image sensor 503 provides a combined image by combining (adding) the light intensity distributions obtained by applying coefficient distributions different for each light intensity distribution observed from the plurality of partial pupils.

The coefficient distribution before the image is captured is set as described with reference to the flowchart in FIG. 1 according to the first embodiment, but this embodiment is different from the first embodiment in variable image capturing parameter.

In the step S101, the coefficient distribution setter 103 sets a viewpoint used to acquire the light intensity distribution data as the variable image capturing parameter. This step may be omitted by always setting a predetermined number of (2×2=4 in this embodiment) viewpoints.

Figure 17A:
FIGS. 17A and 17B illustrate an image capturing scene according to the third embodiment.
Figure 17B:

In the step S102, the prior information acquirer 104 obtains as prior information the information representing a depth distribution in the object space. In the image capturing system having multiple viewpoints as in this embodiment, an occlusion occurs due to a parallax in which an object in an image captured at a certain viewpoint does not appear in another image captured at another viewpoint. FIGS. 17A and 17B illustrate two images captured at different viewpoints, and a positional relationship between the front person and a background changes due to the parallax between these images. A second area (black part) 522 illustrated in FIG. 18 appears in the image in FIG. 17A, but does not appear in the image in FIG. 17B due to the occlusion. This second area 522 is an area used to obtain the information with a high resolution in the image capturing condition when the image illustrated in FIG. 17A is obtained. The position of the occlusion can be identified based on the depth distribution in the object space.

Figure 18:
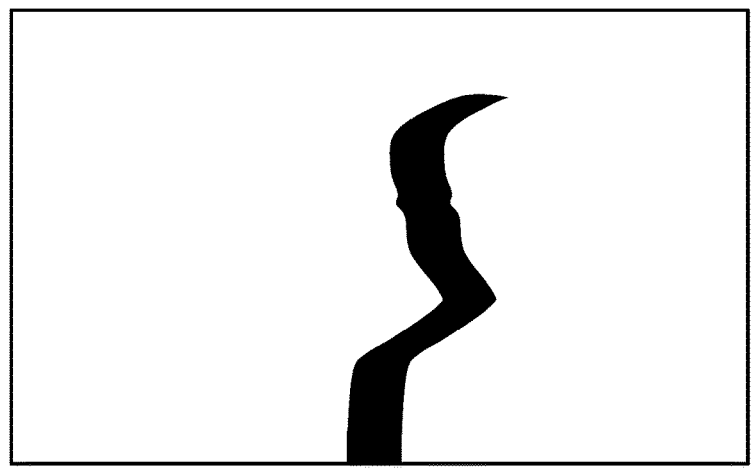
FIG. 18 illustrates a relationship between the image capturing scene and settings of a pixel group according to the third embodiment.

In the step S103, the coefficient distribution setter 103 sets the first pixel group and the second pixel group in the plurality of pixels on the image sensor 101*c* based on the prior information obtained in the step S102. In the example of FIGS. 17A and 17B, the first area 521 illustrated in FIG. 18 is set to the second pixel groups and the second area 522 is set to the first pixel group. The area that appears only in the image illustrated in FIG. 17B may be set to the third pixel group.

In the step S104, the coefficient distribution setter 103 sets the coefficient distribution different for each of the plurality of image capturing conditions. More specifically, the coefficient distribution (first coefficient distribution) on the image capturing condition of the image illustrated in FIG. 17A is set such that the average value or distribution of the coefficient corresponding to the first pixel group is larger than that corresponding to the second pixel group.

The image processing generates (restores) image data on each of the image capturing conditions (viewpoints) based on the combined image after the image is captured as illustrated in the flowchart in FIG. 7 according to the first embodiment. For example, a refocus image can be provided which changes an in-focus position after the image is captured, by using the thus generated image data or the multi-viewpoint images.

This embodiment can provide an image capturing apparatus that can obtain information on the object space with a high resolution and the small observation number.

Fourth Embodiment

A description will be given of an image capturing apparatus according to a fourth embodiment of the present invention. This embodiment uses a wavelength for the variable image capturing parameter. Herein, the wavelength contains both a single wavelength and a wavelength made by weighting and adding a plurality of wavelengths.

FIGS. 19A and 19B illustrate the basic configuration and overview of the image capturing apparatus 600 according to this embodiment. Those elements in FIGS. 19A and 19B, which are corresponding elements in the first embodiment (FIG. 3A), will be designated by the same reference numerals and a description thereof will be omitted. In this embodiment, the prior information acquirer 604 includes an image capturing unit that includes an image sensor 601*c* in which a plurality of color filters, such as RGB filters, are arranged. An image capturing condition changer 609 that includes a plurality of color filters 610*a* to 610*h* with different spectral distributions is provided in front of the imaging optical system 601*a*, as illustrated in FIG. 19B. FIG. 19B illustrates eight color filters 610*a* to 610*h* but another number of color filters may be provided.

The image sensor 601*c* is a monochromatic image sensor that is sensitive to light that has transmitted the color filters 610*a* to 610*h*. The coefficient distribution applier 601*b* is disposed on a front plane of the image sensor 601*c* similar to the first embodiment. In the exposure in the image capturing, the image capturing condition changer 609 rotates and changes a wavelength that serves as the image capturing condition, and the coefficient distribution applier 601*b* applies a different coefficient distribution to the object space optical image (light intensity distribution) obtained with the image capturing condition.

The coefficient distribution before the image is captured is set as explained with reference to the flowchart in FIG. 1 according to the first embodiment, but this embodiment is different from the first embodiment in variable image capturing parameter.

In the step S101, the coefficient distribution setter 603 sets a wavelength used to obtain the light intensity distribution data as the variable image capturing parameter. In other words, the coefficient distribution setter 603 sets one of the color filters 610*a* to 610*h* in the image capturing condition changer 609. The step S101 may be omitted by always using all the color filters 610*a* to 610*h*.

In the step S102, the prior information acquirer 604 obtains the information representing a color distribution in the object space as the prior information. When the obtained wavelength differs, the intensity of the available light intensity distribution differs according to the color of the object. When the light intensity distribution has a low intensity, the S/N ratio lowers and an area in the object in which the light intensity becomes higher on a certain image capturing condition (wavelength) is an area used to obtain the information with a high resolution on the image capturing condition. In order to identify this area, it is necessary to obtain the information representing the color distribution in the object space as the prior information. Thus, the prior information acquirer 604 includes an image sensor with a plurality of color filters, such as RGB filters, different from the image sensor 601*c*. The prior information acquirer 604 and the image capturing condition changer 609 may have a different number of color filters.

In the step S103, the coefficient distribution setter 603 sets the first pixel group and the second pixel group in the plurality of pixels on the image sensor 601*c* based on the prior information obtained in the step S102 similar to the first embodiment. In the step S104, the coefficient distribution setter 603 sets the coefficient distribution different for each of the image capturing condition, similar to the first embodiment.

The image processing generates (restores) image data on each of the image capturing conditions (wavelengths) based on the combined image after the image is captured as illustrated in the flowchart in FIG. 7 according to the first embodiment. This embodiment can obtain a high-resolution image with a high color reproducibility of the object, by using the thus generated image data or the image data with different wavelengths.

While this embodiment discusses the wavelength in the visible range, a wavelength in a nonvisible range (such as an infrared range) may be selected.

The fourth embodiment sets the wavelength (color) to the variable image capturing parameter, but may set the polarization to the image capturing parameter. In this case, the prior information acquirer 604 uses an image sensor in which a plurality of polarization filters having different polarization axis directions are arranged, and the image capturing condition changer 609 uses a plurality of filters having different polarization axis directions. The direction of the plane normal of the object can be calculated with a high resolution by generating the image data with different polarizations. Thereby, the image can be generated with an illumination condition for illuminating the object changed after the image is captured.

The exposure may be set to the variable image capturing parameter. In this case, the prior information acquirer 604 includes an image sensor in which a plurality of light attenuation filters with different transmittances are arranged. Moreover, images with different exposures may be captures a plurality of times. The image capturing condition changer 609 includes a plurality of light attenuation filters with different transmittances. An HDR (high dynamic range) image may be generated by generating the image data with different exposures.

This embodiment can provide an image capturing apparatus that can obtain the information of the object space with a high resolution and the small observation number.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-098709, filed on May 17, 2016, which is hereby incorporated by reference herein in its entirety.

What is claimed is:

1. An image capturing apparatus comprising:
    a light intensity distribution acquirer configured to acquire a light intensity distribution in an object space through image capturing using a plurality of pixels;
    a coefficient distribution setter configured to set a coefficient distribution that is a distribution of a coefficient corresponding to each of the plurality of pixels and is to be applied to the light intensity distribution, such that the coefficient distribution is different for each image capturing condition;
    an information acquirer configured to acquire object space information that is information on the object space and different from the light intensity distribution;
    a pixel group setter configured to set a first pixel group and a second pixel group that are different from each other in the plurality of pixels, based on the object space information; and
    an image generator configured to generate a combined image by combining a plurality of light intensity distributions obtained by applying the coefficient distribution to each of a plurality of light intensity distributions obtained on a plurality of image capturing conditions,
    wherein the coefficient distribution setter sets a first coefficient distribution as at least one of the plurality of coefficient distributions applied to each of the plurality of light intensity distributions, such that fundamental statistics of the coefficient distribution for the first pixel group is different from that for the second pixel group in the first coefficient distribution.

2. The image capturing apparatus according to claim 1, wherein the object space information includes information on a distribution of at least one of a light amount of the object space, an edge of the object space, a polarization of the object space, a distance of the object space, and a motion of the object space relative to the image capturing apparatus.

3. The image capturing apparatus according to claim 1, wherein the fundamental statistics includes at least one of a representative value and a dissemination of the coefficient.

4. The image capturing apparatus according to claim 1, wherein the fundamental statistics includes at least one of an average value, a median, a mode, a contrast ratio, and a dispersion of the coefficient.

5. The image capturing apparatus according to claim 1, wherein an average value or dispersion of the coefficient corresponding to the first pixel group is different from that corresponding to the second pixel group in the first coefficient distribution.

6. The image capturing apparatus according to claim 1, wherein the fundamental statistics of a coefficient distribution for the first pixel group and that for the second pixel group in the first coefficient distribution are different from each other by an amount at least one-tenth as large as a smaller one of the fundamental statistics.

7. The image capturing apparatus according to claim 1, wherein the first pixel group has a larger average value of the coefficient as the fundamental statistics in the first coefficient distribution among the first and second pixel groups, and
wherein the plurality of coefficient distributions include a second coefficient distribution different from the first coefficient distribution, and an average value of the coefficient for the second pixel group is larger than that for the first pixel group in the second coefficient distribution.

8. The image capturing apparatus according to claim 1, wherein the following conditions are satisfied, $$0.5 < \frac{c_{ave}(G_1)}{c_{ave}(G_2)} < 2$$

$$c_{ave}(G_j) = \frac{1}{L_j} \sum_{i \in G_j} \sum_{k=1}^{K} c_k(p_i)$$

where $p_i$ is an i-th pixel among the plurality of pixels, K is a total number of image capturing conditions, $c_k(p_i)$ is a coefficient for the pixel $p_i$ on a k-th image capturing condition, $G_1$ is the first pixel group, $G_2$ is the second pixel group, $L_1$ is the number of pixels in the first pixel group, and $L_2$ is the number of pixels in the second pixel group.

9. The image capturing apparatus according to claim 1, wherein an average value ratio and a dispersion ratio are defined as ratios made by dividing an average value and a dispersion of the coefficient corresponding to each pixel groups in the first coefficient distribution by a corresponding one of the average value and the dispersion of the coefficient corresponding to each pixel groups in a second coefficient distribution different from the first coefficient distribution, and
wherein the first pixel group and second pixel group are different from each other in average value ratio or dispersion ratio.

10. The image capturing apparatus according to claim 1, wherein in the first coefficient distribution, both an average value and a dispersion of the coefficient corresponding to the first pixel group are larger or smaller than those corresponding to the second pixel group.

11. The image capturing apparatus according to claim 1, wherein a same intensity pixel group is defined as a pixel group in the plurality of pixels, which has a difference among the plurality of light intensity distribution obtained on the plurality of image capturing conditions in the plurality of pixels, smaller than a threshold, and
wherein the following conditions are satisfied, $$0.9 \leq \frac{\min_{p_i \in G_{same}} c_{ksum}(p_i)}{\max_{p_i \in G_{same}} c_{ksum}(p_i)} \leq 1.0$$

$$c_{ksum}(p_i) = \sum_{k=1}^{K} c_k(p_i)$$

where $p_i$ of an i-th pixel among the plurality of pixels, K is a total number of image capturing conditions, $c_k(p_i)$ is a coefficient for the pixel $p_i$ on a k-th image capturing condition, and $G_{same}$ is the same intensity pixel group.

12. The image capturing apparatus according to claim 1, wherein the pixel group setter sets the first pixel group or second pixel group on a specific image capturing condition in the plurality of image capturing conditions to a pixel group used to obtain the light intensity distribution with a higher resolution than that on another image capturing condition or with another pixel group, and
wherein the coefficient setter sets the first coefficient distribution to the light intensity distribution obtained on the specific image capturing condition.

13. An image processing apparatus installed in or separate from an image capturing apparatus,
wherein the image capturing comprising:
a light intensity distribution acquirer configured to acquire a light intensity distribution in an object space through image capturing using a plurality of pixels;
a coefficient distribution setter configured to set a coefficient distribution that is a distribution of a coefficient corresponding to each of the plurality of pixels and is to be applied to the light intensity distribution, such that the coefficient distribution is different for each image capturing condition;
an information acquirer configured to acquire object space information that is information on the object space and different from the light intensity distribution;
a pixel group setter configured to set a first pixel group and a second pixel group that are different from each other in the plurality of pixels, based on the object space information; and
an image generator configured to generate a combined image by combining a plurality of light intensity distributions obtained by applying the coefficient distribution to each of a plurality of light intensity distributions obtained on a plurality of image capturing conditions,
wherein the coefficient distribution setter sets a first coefficient distribution as at least one of the plurality of coefficient distributions applied to each of the plurality of light intensity distributions, such that fundamental statistics of the coefficient distribution for the first pixel group is different from that for the second pixel group in the first coefficient distribution, and
wherein the image processing apparatus comprises an image estimator configured to generate image data through an estimation process, which corresponds to at least one of the plurality of image capturing conditions based on the combined image.

14. An image capturing method comprising:
a step of acquiring a light intensity distribution in an object space through image capturing using a plurality of pixels;
a coefficient distribution setting step configured to set a coefficient distribution that is a distribution of a coefficient corresponding to each of the plurality of pixels and is to be applied to the light intensity distribution, such that the coefficient distribution is different for each image capturing condition;
a step of acquiring object space information that is information on the object space and different from the light intensity distribution;
a step of setting a first pixel group and a second pixel group that are different from each other in the plurality of pixels, based on the object space information; and
a step of generating a combined image by combining a plurality of light intensity distributions obtained by applying the coefficient distribution to each of a plurality of light intensity distributions obtained on a plurality of image capturing conditions, wherein the coefficient distribution setting step sets a first coefficient distribution as at least one of the plurality of coefficient distributions applied to each of the plurality of light intensity distributions, such that fundamental statistics of the coefficient distribution for the first pixel group is different from that for the second pixel group in the first coefficient distribution.

15. A non-transitory computer readable storage medium storing an image capturing program that enables a computer to execute an image capturing method, the image capturing method comprising:
   a step of acquiring a light intensity distribution in an object space through image capturing using a plurality of pixels;
   a coefficient distribution setting step configured to set a coefficient distribution that is a distribution of a coefficient corresponding to each of the plurality of pixels and is to be applied to the light intensity distribution, such that the coefficient distribution is different for each image capturing condition;
   a step of acquiring object space information that is information on the object space and different from the light intensity distribution;
   a step of setting a first pixel group and a second pixel group that are different from each other in the plurality of pixels, based on the object space information; and
   a step of generating a combined image by combining a plurality of light intensity distributions obtained by applying the coefficient distribution to each of a plurality of light intensity distributions obtained on a plurality of image capturing conditions,
wherein the coefficient distribution setting step sets a first coefficient distribution as at least one of the plurality of coefficient distributions applied to each of the plurality of light intensity distributions, such that fundamental statistics of the coefficient distribution for the first pixel group is different from that for the second pixel group in the first coefficient distribution.

* * * * *